United States Patent
Ogasawara et al.

(10) Patent No.: US 9,262,082 B2
(45) Date of Patent: Feb. 16, 2016

(54) STORAGE APPARATUS, CONTROL APPARATUS, AND DATA COPYING METHOD

(75) Inventors: Yasuhiro Ogasawara, Fujisawa (JP); Shigeru Akiyama, Kawasaki (JP); Tatsuya Yanagisawa, Kawasaki (JP); Tsukasa Matsuda, Kawasaki (JP); Kosuke Ota, Kawasaki (JP); Hitoshi Kosokabe, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 125 days.

(21) Appl. No.: 13/571,676

(22) Filed: Aug. 10, 2012

(65) Prior Publication Data
US 2013/0046946 A1 Feb. 21, 2013

(30) Foreign Application Priority Data
Aug. 19, 2011 (JP) ................................. 2011-179504

(51) Int. Cl.
*G06F 3/06* (2006.01)

(52) U.S. Cl.
CPC .............. *G06F 3/0613* (2013.01); *G06F 3/065* (2013.01); *G06F 3/0647* (2013.01); *G06F 3/0689* (2013.01)

(58) Field of Classification Search
CPC ..... G06F 3/0647; G06F 3/067; G06F 3/0665; G06F 3/0605; G06F 3/061; G06F 3/0608; G06F 3/0689; G06F 3/0617; G06F 3/0653; G06F 3/0631; G06F 3/0613; G06F 3/0635; G06F 3/0685; G06F 11/3485; G06F 11/0727; G06F 11/3409; G06F 3/0625; G06F 3/0649; G06F 3/065; G06F 11/0775; G06F 11/1464; G06F 12/02; G06F 2206/1012; G06F 3/0634; G06F 3/0644; G06F 11/0715; G06F 11/1497; G06F 11/3419; G06F 2201/81; G06F 3/0664; G06F 3/0671; G06F 3/0683; G06F 11/0751; G06F 11/1662; G06F 11/2028; G06F 11/3442; G06F 2201/815; G06F 2206/1008; G06F 3/0604; G06F 3/0611; G06F 3/0632; G06F 3/0637; G06F 9/45533; G06F 9/4856; G06F 9/5077; G06F 11/0748; G06F 11/1076; G06F 11/1402; G06F 11/1423; G06F 11/1453; G06F 11/1456; G06F 11/1471; G06F 11/1666; G06F 11/20; G06F 11/2025; G06F 11/2038; G06F 11/2071; G06F 11/3034; G06F 11/3051; G06F 11/3447; G06F 11/3457; G06F 12/023; G06F 12/00; G06F 17/30067; G06F 17/303; G06F 1/3221; G06F 1/3268; G06F 2009/4557; G06F 2009/45579; G06F 2212/224; G06F 3/0619; G06F 3/062; G06F 3/0628; G06F 3/0629; G06F 3/0641; G06F 3/0646; G06F 3/0659; G06F 3/0662; G06F 3/0682; G06F 3/0686; G06F 5/06; G06F 9/5011; G06F 9/5088; G06F 17/30079; H04L 67/1097; H04L 41/046; H04L 41/0893; H04L 43/16; H04L 45/586; H04L 49/357; H04L 49/45

See application file for complete search history.

(56) References Cited

U.S. PATENT DOCUMENTS 6,055,433 A * 4/2000 Yuan et al. .................... 455/453
6,711,649 B1 * 3/2004 Bachmat et al. ............... 711/114
(Continued)

FOREIGN PATENT DOCUMENTS

JP 2008-108020 A 5/2008
JP 2010-191859 A 9/2010

OTHER PUBLICATIONS

Principle: Throughput vs. Processing Time/Std Dev. by (No Author Listed); Publication of Factory Physics™ Feb. 2001; http://factoryphysics.com/principle/station/synch/unpaced/PrincipleMeanStddev.htm.*

(Continued)

*Primary Examiner* — Reginald Bragdon
*Assistant Examiner* — Paul Knight
(74) *Attorney, Agent, or Firm* — Fujitsu Patent Center

(57) ABSTRACT

A determining unit selects one storage device each from storage devices of an external storage apparatus and storage devices of a storage apparatus to which the determining unit belongs. At this point, based on a copy request, the determining unit preferentially selects, within each of the external storage apparatus and the storage apparatus, a storage device including a larger number of logical volumes (LVs) which belong to copy unexecuted LV pairs compared to other storage devices therein. Further, the determining unit determines, as a copy execution target, a copy unexecuted LV pair in which a LV provided in one of the selected two storage devices is a copy source and a LV provided in the other storage device is a copy destination. A copy unit copies data stored in the copy source LV, which belongs to the determined LV pair, to the copy destination LV of the LV pair.

8 Claims, 30 Drawing Sheets

(56) References Cited

U.S. PATENT DOCUMENTS

| | | | |
|---|---|---|---|
| 7,831,792 B2 | 11/2010 | Maruyama et al. | |
| 2003/0065883 A1* | 4/2003 | Bachmat | 711/114 |
| 2008/0216086 A1* | 9/2008 | Tanaka et al. | 718/105 |
| 2009/0287744 A1* | 11/2009 | Bernardini et al. | 707/202 |
| 2010/0217932 A1 | 8/2010 | Yamada et al. | |
| 2010/0325281 A1* | 12/2010 | Li et al. | 709/226 |

OTHER PUBLICATIONS

Which RAID Level is Right for Me?; by Adaptec as published on the internet Mar. 6, 2010 at: http://www.adaptec.com/en-us/_common/compatibility/_education/raid_level_compar_wp.htm.*

User-Centric Data Migration in Networked Storage Systems by Kang and Reddy; IEEE 2008.*

Issues in the Design of Multi-Server File Systems to Cope with Load Skew by Sitaram, Dan, and Yu; IEEE 1993.*

* cited by examiner

FIG. 11

31 TRANSFER INFORMATION

| TRANSFER DESTINATION | | TRANSFER SOURCE | |
|---|---|---|---|
| ID | LUN | ID | LUN |
| A | 0x01 | a | 0x02 |
| A | 0x03 | a | 0x04 |
| B | 0x06 | a | 0x07 |
| ⋮ | ⋮ | ⋮ | ⋮ |
| G | 0xFF | g | 0x80 |

FIG. 13

152 TRANSFER DESTINATION MANAGEMENT TABLE

| ID | TOTAL NUMBER | READY COUNT | USING COUNT |
|----|----|----|----|
| A | 3 | 3 | 0 |
| B | 3 | 5 | 0 |
| C | 3 | 3 | 0 |
| D | 5 | 5 | 0 |
| E | 3 | 3 | 0 |
| F | 10 | 10 | 0 |
| G | 10 | 10 | 0 |

153 TRANSFER SOURCE MANAGEMENT TABLE

| ID | TOTAL NUMBER | READY COUNT | USING COUNT |
|---|---|---|---|
| a | 5 | 5 | 0 |
| b | 5 | 5 | 0 |
| c | 5 | 5 | 0 |
| d | 7 | 7 | 0 |
| e | 6 | 6 | 0 |
| f | 8 | 8 | 0 |
| g | 6 | 6 | 0 |

FIG. 17

152 TRANSFER DESTINATION MANAGEMENT TABLE

| ID | TOTAL NUMBER | READY COUNT | USING COUNT |
|---|---|---|---|
| A | 3 | 3 | 0 |
| B | 5 | 5 | 0 |
| C | 3 | 3 | 0 |
| D | 5 | 5 | 0 |
| E | 3 | 3 | 0 |
| F | 10 | 10 | 0 |
| G | 10 | 10 | 0 |

SORTING

152 TRANSFER DESTINATION MANAGEMENT TABLE

| ROW NUMBER | ID | TOTAL NUMBER | READY COUNT | USING COUNT |
|---|---|---|---|---|
| 1 | F | 10 | 10 | 0 |
| 2 | G | 10 | 10 | 0 |
| 3 | B | 5 | 5 | 0 |
| 4 | D | 5 | 5 | 0 |
| 5 | A | 3 | 3 | 0 |
| 6 | C | 3 | 3 | 0 |
| 7 | E | 3 | 3 | 0 |

HIGH ↑ PRIORITY ORDER ↓ LOW

FIG. 18

152 TRANSFER DESTINATION MANAGEMENT TABLE

| ROW NUMBER | ID | TOTAL NUMBER | READY COUNT | USING COUNT |
|---|---|---|---|---|
| 1 | A | 3 | 3 | 0 |
| 2 | B | 5 | 5 | 0 |
| 3 | C | 3 | 3 | 0 |
| 4 | D | 5 | 4 | 1 |
| 5 | E | 3 | 3 | 0 |
| 6 | F | 10 | 5 | 1 |
| 7 | G | 10 | 8 | 1 |

SORTING

152 TRANSFER DESTINATION MANAGEMENT TABLE

| ROW NUMBER | ID | TOTAL NUMBER | READY COUNT | USING COUNT |
|---|---|---|---|---|
| 1 | B | 5 | 5 | 0 |
| 2 | A | 3 | 3 | 0 |
| 3 | C | 3 | 3 | 0 |
| 4 | E | 3 | 3 | 0 |
| 5 | G | 10 | 8 | 1 |
| 6 | F | 10 | 5 | 1 |
| 7 | D | 5 | 4 | 1 |

HIGH ↑ PRIORITY ORDER ↓ LOW

| TRANSFER DESTINATION | |
|---|---|
| ID | READY COUNT |
| A | 3 |
| B | 2 |
| C | 3 |
| D | 2 |
| E | 5 |
| TOTAL | 15 |
| STANDARD DEVIATION ($\sigma$) | 1.1 |

| TRANSFER SOURCE | |
|---|---|
| ID | READY COUNT |
| a | 1 |
| b | 5 |
| c | 3 |
| d | 2 |
| e | 4 |
| TOTAL | 15 |
| STANDARD DEVIATION ($\sigma$) | 1.4 |

SEVENTEENTH STATE

152a TRANSFER DESTINATION MANAGEMENT TABLE

| ROW NUMBER | ID | READY COUNT | USING COUNT |
|---|---|---|---|
| 1 | B | 0 | 0 |
| 2 | A | 0 | 0 |
| 3 | C | 0 | 0 |
| STANDARD DEVIATION | | | 0.0 |

153a TRANSFER SOURCE MANAGEMENT TABLE

| ROW NUMBER | ID | READY COUNT | USING COUNT |
|---|---|---|---|
| 1 | c | 0 | 0 |
| 2 | a | 0 | 0 |
| 3 | b | 0 | 0 |
| STANDARD DEVIATION | | | 0.0 |

151a STATE MANAGEMENT TABLE

| | TRANSFER DESTINATION | | TRANSFER SOURCE | | STATE |
|---|---|---|---|---|---|
| | ID | LUN | ID | LUN | |
| 1 | A | 0x00 | a | 0x00 | FINISHED |
| 2 | A | 0x01 | b | 0x00 | FINISHED |
| 3 | A | 0x02 | c | 0x00 | FINISHED |
| 4 | B | 0x00 | a | 0x01 | FINISHED |
| 5 | B | 0x01 | b | 0x01 | FINISHED |
| 6 | B | 0x02 | c | 0x01 | FINISHED |
| 7 | C | 0x00 | a | 0x02 | FINISHED |
| 8 | C | 0x01 | b | 0x02 | FINISHED |
| 9 | C | 0x02 | c | 0x02 | FINISHED |

...

SIXTEENTH STATE

152a TRANSFER DESTINATION MANAGEMENT TABLE

| ROW NUMBER | ID | READY COUNT | USING COUNT |
|---|---|---|---|
| 1 | B | 0 | 1 |
| 2 | A | 0 | 0 |
| 3 | C | 0 | 2 |
| STANDARD DEVIATION | | | 0.0 |

153a TRANSFER SOURCE MANAGEMENT TABLE

| ROW NUMBER | ID | READY COUNT | USING COUNT |
|---|---|---|---|
| 1 | c | 0 | 1 |
| 2 | a | 0 | 1 |
| 3 | b | 0 | 1 |
| STANDARD DEVIATION | | | 0.0 |

151a STATE MANAGEMENT TABLE

| | TRANSFER DESTINATION | | TRANSFER SOURCE | | STATE |
|---|---|---|---|---|---|
| | ID | LUN | ID | LUN | |
| 1 | A | 0x00 | a | 0x00 | FINISHED |
| 2 | A | 0x01 | b | 0x00 | FINISHED |
| 3 | A | 0x02 | c | 0x00 | FINISHED |
| 4 | B | 0x00 | a | 0x01 | FINISHED |
| 5 | B | 0x01 | b | 0x01 | FINISHED |
| 6 | B | 0x02 | c | 0x01 | USING |
| 7 | C | 0x00 | a | 0x02 | USING |
| 8 | C | 0x01 | b | 0x02 | USING |
| 9 | C | 0x02 | c | 0x02 | FINISHED |

STORAGE APPARATUS, CONTROL APPARATUS, AND DATA COPYING METHOD

CROSS-REFERENCE TO RELATED APPLICATION

This application is based upon and claims the benefit of priority of the prior Japanese Patent Application No. 2011-179504, filed on Aug. 19, 2011, the entire contents of which are incorporated herein by reference.

FIELD

The embodiments discussed herein are related to a storage apparatus for performing data transfer between volumes.

BACKGROUND

There are cases where data stored in a storage apparatus needs to be transferred to another storage apparatus. For example, in the case where an existing storage apparatus is replaced with a higher-performance storage apparatus, data transfer is carried out from the existing storage apparatus to the higher-performance storage apparatus. Such data transfer between storage apparatuses is referred to as data migration. In the case of carrying out data migration, for example, one of logical volumes in the storage apparatuses is specified as each of a transfer source and a transfer determination. The logical volumes are those logically provided in disk devices of the storage apparatuses.

In data migration, large quantities of data are transferred between storage apparatuses. Therefore, along with capacity enlargement of storage apparatuses, data migration tends to require a prolonged period of time. In view of such a problem, for example, a technique to reduce competition for physical resources at the time of parallel transfer between volumes has been proposed as data migration technology.

Japanese Laid-open Patent Application Publication No. 2008-108020

However, it is sometimes the case that the conventional technique for reducing competition for physical resources is not sufficient to promote processing efficiency for the entire data migration processing. For example, assume that there are variations in the number of logical volumes of individual disk devices, which logical volumes are data transfer units. In such a case, in only particular disk devices, multiple logical volumes may be left without being subjected to data transfer at the final stage of the data transfer. In this case, at the final stage of the data transfer, access concentration to the particular disk devices occurs, which reduces efficiency in data copy processing for the data transfer.

SUMMARY

According to one aspect, there is provided a storage apparatus having multiple storage devices. The storage apparatus includes an acquiring unit configured to acquire a copy request which indicates multiple logical volume pairs, each of which is made up of a copy source and a copy destination, the copy source being one of logical volumes provided in multiple storage devices of an external storage apparatus, and the copy destination being one of logical volumes provided in the multiple storage devices of the storage apparatus; a determining unit configured to, based on the copy request, preferentially select, from among the multiple storage devices of the external storage apparatus, a storage device including a larger number of logical volumes which belong to copy unexecuted logical volume pairs compared to other storage devices of the external storage apparatus and preferentially select, from among the multiple storage devices of the storage apparatus, a storage device including a larger number of logical volumes which belong to copy unexecuted logical volume pairs compared to other storage devices of the storage apparatus, and determine, as a copy execution target, a copy unexecuted logical volume pair whose copy source is a logical volume provided in one of the two selected storage devices and copy destination is a logical volume provided in the other one of the two selected storage devices; and a copy unit configured to copy data stored in the logical volume which is the copy source of the determined logical volume pair to the logical volume which is the copy destination of the determined logical volume pair.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 illustrates an example of a data structure of transfer information;

FIG. 13 is an example of a data structure of a transfer destination management table;

FIG. 17 illustrates a first sorting example of the transfer destination management table;

FIG. 18 illustrates a second sorting example of the transfer destination management table;

FIG. 29 is a fifth diagram illustrating the information transition at the time of data transfer; and FIG. 30 is a sixth diagram illustrating the information transition at the time of data transfer.

DESCRIPTION OF EMBODIMENTS

Figure 1:
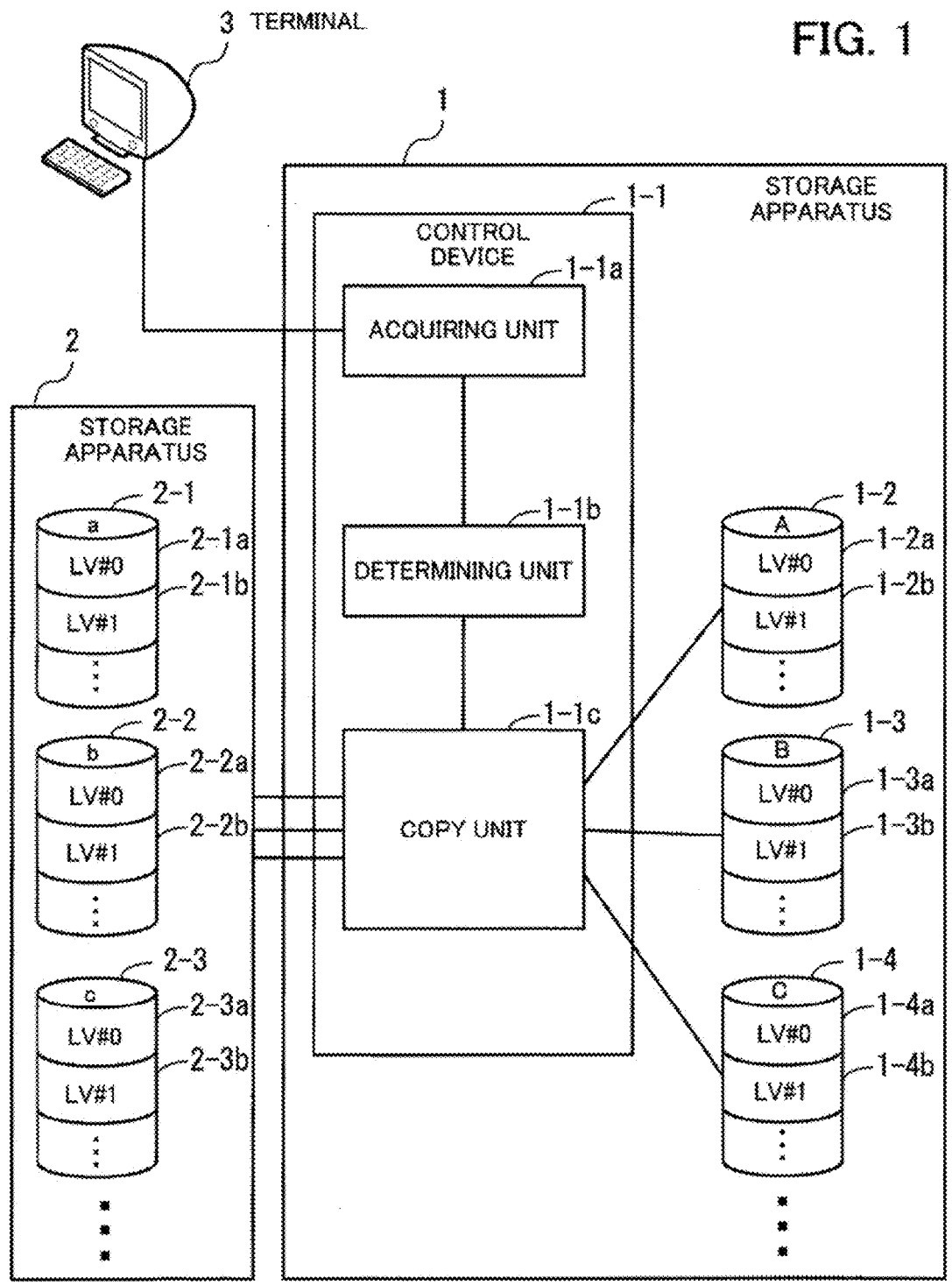
FIG. 1 illustrates an example of functional structures of storage apparatuses according to a first embodiment.

Several embodiments will be described below with reference to the accompanying drawings, wherein like reference numerals refer to like elements throughout. Note that two or more of the embodiments may be combined for implementation in such a way that no contradiction arises.

(a) First Embodiment

FIG. 1 illustrates an example of functional structures of storage apparatuses according to a first embodiment. According to the first embodiment, a storage apparatus 1 and a storage apparatus 2 are connected to each other by a cable. The storage apparatus 1 includes a control device 1-1 and multiple memory devices 1-2, 1-3, 1-4, and . . . In the memory device 1-2, multiple logical volumes 1-2a, 1-2b, and . . . are provided. Similarly, in the memory device 1-3, multiple logical volumes 1-3a, 1-3b, and . . . are provided. Similarly, in the memory device 1-4, multiple logical volumes 1-4a, 1-4b, and . . . are provided.

The storage apparatus 2 includes multiple memory devices 2-1, 2-2, 2-3, and . . . In the memory device 2-1, multiple logical volumes 2-1a, 2-1b, and . . . are provided. Similarly, in the memory device 2-2, multiple logical volumes 2-2a, 2-2b, and . . . are provided. Similarly, in the memory device 2-3, multiple logical volumes 2-3a, 2-3b, and . . . are provided.

The control device 1-1 of the storage apparatus 1 includes an acquiring unit 1-1a, a determining unit 1-1b, and a copy unit 1-1c. The acquiring unit 1-1a acquires a copy request which indicates multiple logical volume pairs. For example, the acquiring unit 1-1a acquires a copy request which is input from a terminal 3 connected to the storage apparatus 1. Each logical volume pair is a pair of a copy source logical volume and a copy destination logical volume. In the logical volume pairs, for example, logical volumes provided for the individual memory devices 2-1, 2-2, 2-3, and . . . in the storage apparatus 2 are indicated as copy sources. In addition, in the logical volume pairs, for example, logical volumes provided for the individual memory devices 1-2, 1-3, 1-4, and . . . in the storage apparatus 1 are indicated as copy destinations. Based on the copy request, the determining unit 1-1b selects one memory device each from the multiple memory devices 2-1, 2-2, 2-3, and . . . of the storage apparatus 2 and the multiple memory devices 1-2, 1-3, 1-4, and . . . of the storage apparatus 1. For example, the determining unit 1-1b preferentially selects, within each of the storage apparatuses 1 and 2, a memory device including a larger number of logical volumes which belong to copy unexecuted logical volume pairs compared to other memory devices of the storage apparatus. Further, the determining unit 1-1b determines, as a copy execution target, a copy unexecuted logical volume pair in which a logical volume provided in one of the selected two memory devices is a copy source and a logical volume provided in the other memory device is a copy destination. The copy unit 1-1c copies data stored in the copy source logical volume, which belongs to the logical volume pair determined as a copy execution target, to the copy destination logical volume of the logical volume pair. Note that, in FIG. 1, each line connecting the individual components represents a part of communication paths, and communication paths other than those illustrated in FIG. 1 are also configurable.

Figure 2:
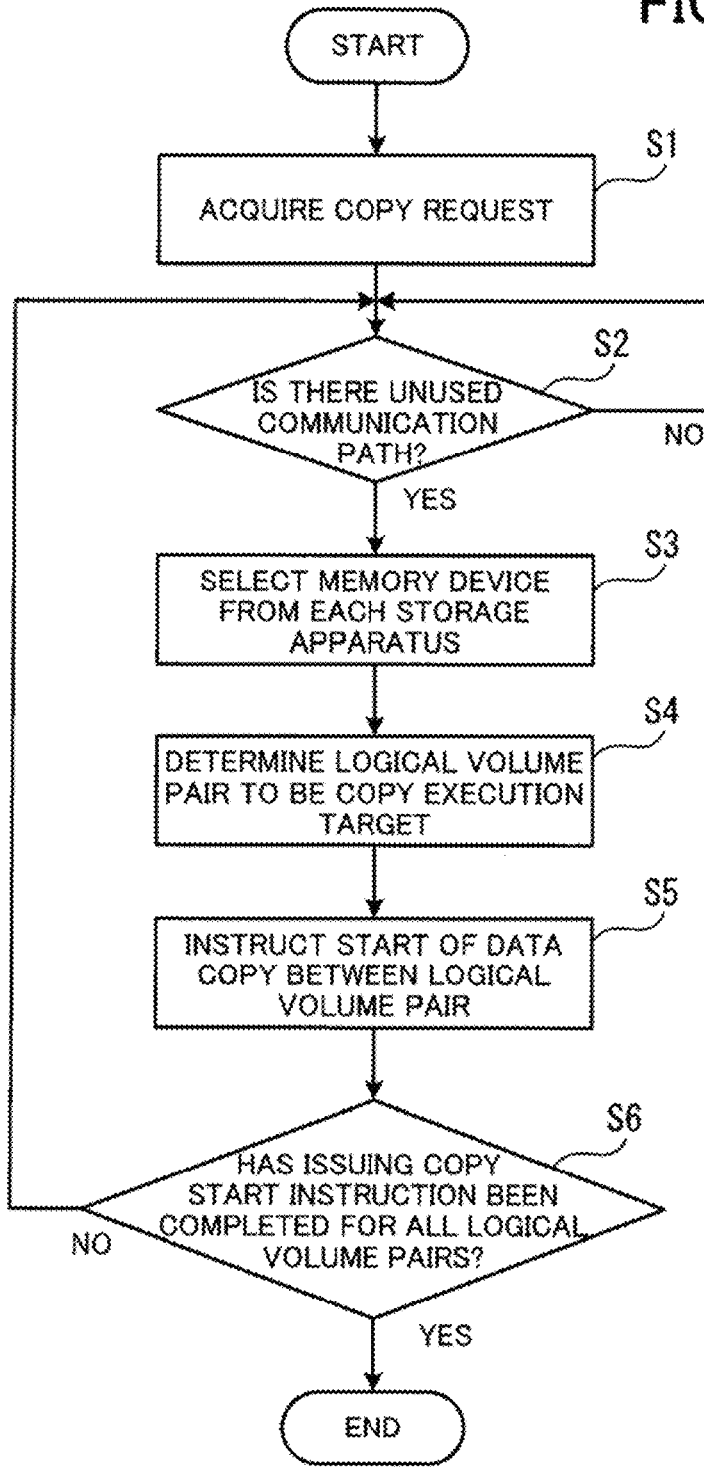
FIG. 2 is a flowchart illustrating an example of a procedure of data copy processing according to the first embodiment.

Next described is a procedure of data copy processing performed by the system illustrated in FIG. 1. FIG. 2 is a flowchart illustrating an example of a procedure of data copy processing according to the first embodiment. The processing of FIG. 2 is described next according to the step numbers.

[Step S1] The acquiring unit 1-1a acquires a copy request. The acquiring unit 1-1a transmits the acquired copy request to the determining unit 1-1b.

[Step S2] The determining unit 1-1b determines whether there is an unused communication path between the storage apparatuses 1 and 2. For example, the determining unit 1-1b determines that there is one or more unused communication paths if the number of logical volume pairs in copy execution is smaller than the number of communication paths established between the storage apparatuses 1 and 2. The determining unit 1-1b proceeds the processing to Step S3 when there is an unused communication path. On the other hand, when there is no unused communication path, the determining unit 1-1b repeats the process of Step S2 and waits until a communication path becomes not in use.

[Step S3] The determining unit 1-1b selects one memory device each from the storage apparatuses 1 and 2. For example, the determining unit 1-1b preferentially selects, within each of the storage apparatuses 1 and 2, a memory device including a larger number of logical volumes which belong to copy unexecuted logical volume pairs compared to other memory devices of the storage apparatus.

[Step S4] The determining unit 1-1b determines, as a copy execution target, a copy unexecuted logical volume pair in which a logical volume provided in one of the selected two memory devices is a copy source and a logical volume provided in the other memory device is a copy destination.

[Step S5] The determining unit 1-1b instructs the copy unit 1-1c to start data copy between the logical volume pair determined as a copy execution target. Using an unused communication path, the copy unit 1-1c copies data stored in the copy source logical volume, which belongs to the logical volume pair determined as a copy execution target, to the copy destination logical volume of the logical volume pair. After giving an instruction of starting the data copy, the determining unit 1-1b proceeds the processing to Step S6 without waiting for the completion of the data copy.

[Step S6] The determining unit 1-1b determines whether issuing the copy start instruction has been completed with respect to all logical volume pairs indicated in the copy request. In the case where issuing the copy start instruction has been completed for all the logical volume pairs, the determining unit 1-1b ends the processing. On the other hand, when there is one or more logical volume pairs to which the copy start instruction has yet to be made, the determining unit 1-1b proceeds the processing to Step S2.

Figure 3:
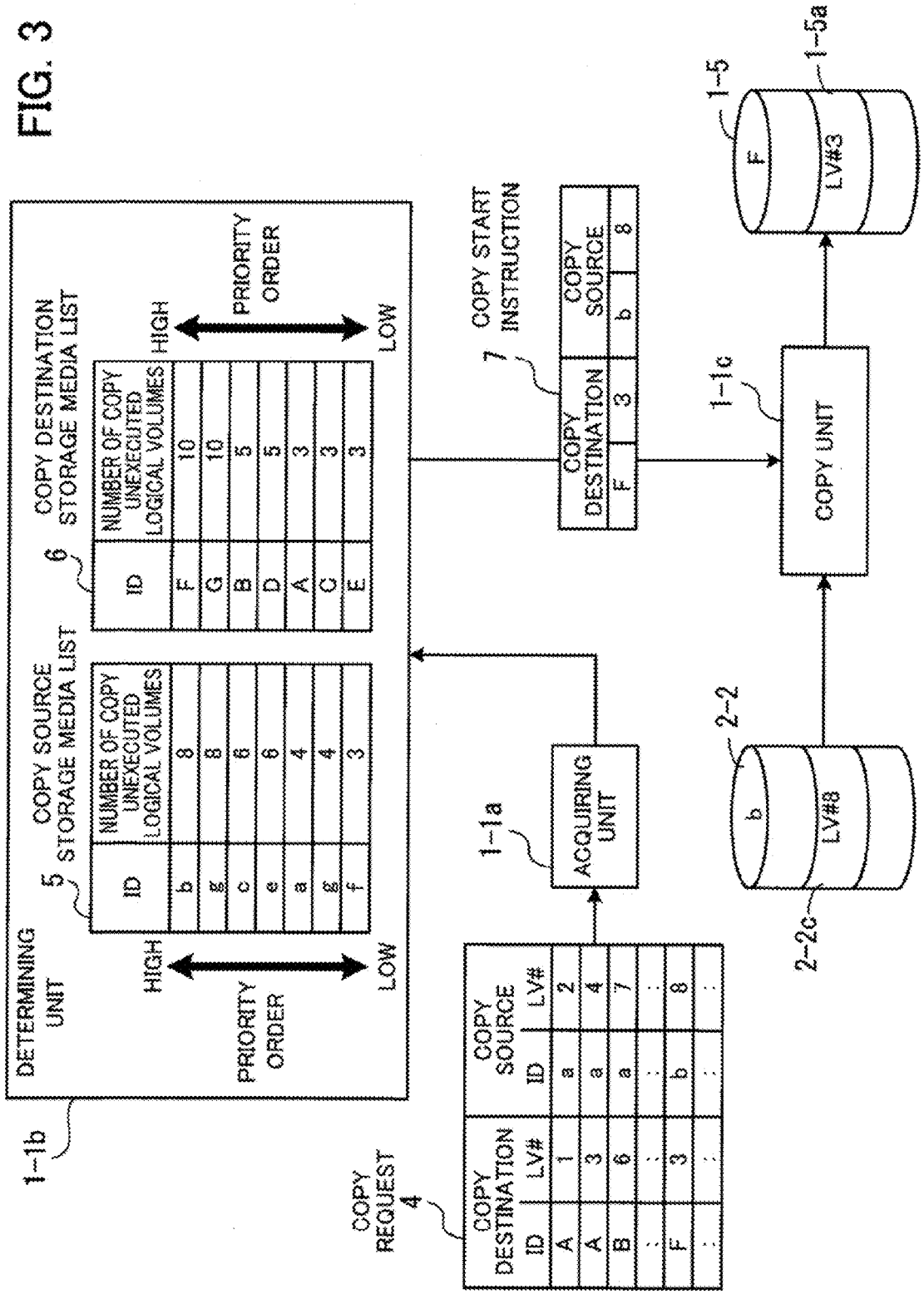
FIG. 3 illustrates an example of determining logical volume pairs to be copy execution targets according to the first embodiment.

Next described is an example of determining logical volume pairs to be copy execution targets. FIG. 3 illustrates an example of determining logical volume pairs to be copy execution targets according to the first embodiment. As illustrated in FIG. 3, a copy request 4 includes multiple logical volume pairs, each of which includes identification information of a copy destination logical volume and identification information of a copy source logical volume. The identification information of each logical volume is represented by an identifier (ID) of a storage medium to which the logical volume belongs and an identification number (LV#) of the logical volume in the storage medium.

The input copy request 4 is sent to the determining unit 1-1b via the acquiring unit 1-1a. The determining unit 1-1b manages a priority order for selecting storage media using, for example, a copy source storage media list 5 and a copy destination storage media list 6.

In the copy source storage media list 5, IDs of storage media included in the storage apparatus 2 are set. The ID of each storage medium is registered in association with the number of logical volumes, which belong to copy unexecuted logical volume pairs, in the storage medium ("the number of copy unexecuted logical volumes"). The determining unit 1-1b sorts records of individual storage media in the copy source storage media list 5, for example, in descending order of the number of copy unexecuted logical volumes. Subsequently, the determining unit 1-1b preferentially selects a storage medium at the top of the sorting result.

In the copy destination storage media list 6, IDs of storage media in the storage apparatus 1 are set. The ID of each storage medium is registered in association with the number of logical volumes, which belong to copy unexecuted logical volume pairs, in the storage medium ("the number of copy unexecuted logical volumes"). The determining unit 1-1b sorts records of individual storage media in the copy destination storage media list 6, for example, in descending order of the number of copy unexecuted logical volumes. Subsequently, the determining unit 1-1b preferentially selects a storage medium at the top of the sorting result.

According to the example of FIG. 3, the memory device 2-2 with an ID "b" at the top of the priority order is selected from among the memory devices 2-1, 2-2, 2-3, and . . . of the storage apparatus 2, which is a copy source. Similarly, the memory device 1-5 with an ID "F" at the top of the priority order is selected from among the memory devices 1-2, 1-3, 1-4, and . . . of the storage apparatus 1, which is a copy destination. The determining unit 1-1b searches logical volume pairs included in the copy request 4 for a copy unexecuted logical volume pair in which one of the two selected memory devices 2-2 and 1-5 is a copy source and the other one is a copy destination. Assume that all logical volume pairs in the example of FIG. 3 are copy unexecuted logical volume pairs. In that case, a logical volume pair is detected in which the logical volume 2-2c with an identification number "8" in the memory device 2-2 is a copy source and the logical volume 1-5a with an identification number "3" in the memory device 1-5 is a copy destination. The determining unit 1-1b determines the detected logical volume pair as a copy execution target. The determining unit 1-1b transmits, to the copy unit 1-1c, a copy start instruction 7 which specifies the logical volume pair to be a copy execution target. In response to the copy start instruction 7, the copy unit 1-1c copies data of the logical volume 2-2c in the memory device 2-2 to the logical volume 1-5a in the memory device 1-5.

Thus, in a data copy operation according to the first embodiment, a memory device including a larger number of copy unexecuted logical volumes is preferentially selected, and the selected memory device is designated as a copy source or a copy destination. By means of this, a situation may be prevented where, in only particular memory devices, multiple logical volumes are left without copy execution and, accordingly, access concentration to those particular memory devices occurs at the final stage of the data copy processing for all the logical volume pairs indicated in the copy request 4. This improves efficiency in data copy processing between the storage apparatuses.

Note that there may be no copy unexecuted logical volume pair in which one of the two selected memory devices is a copy source and the other one is a copy destination. In this case, for example, the determining unit 1-1b finds a variation, within the multiple memory devices 2-1, 2-2, 2-3, and . . . of the storage apparatus 2, in the number of logical volumes which belong to individual copy unexecuted logical volume pairs. Similarly, the determining unit 1-1b finds a variation, within the multiple memory devices 1-2, 1-3, 1-4, and . . . of the storage apparatus 1, in the number of logical volumes which belong to individual copy unexecuted logical volume pairs. The determining unit 1-1b compares the variations individually obtained from the storage apparatuses 1 and 2. Subsequently, for a storage apparatus having a smaller one of the variations, the determining unit 1-1b cancels selection of a memory device selected from among multiple memory devices of the storage apparatus. The determining unit 1-1b then selects, out of the multiple memory devices, a memory device other than the memory device whose selection has been canceled. Based on the other memory device whose selection is not cancelled and the newly selected memory device, the determining unit 1-1b searches for a copy unexecuted logical volume pair in which one of these two selected memory devices is a copy source and the other one is a copy destination.

In the above-described manner, as for the storage apparatus having a larger variation, the memory device having a larger number of copy unexecuted logical volumes remains being selected, and as for the storage apparatus having a smaller variation, a memory device to be selected is changed. Subsequently, based on those memory devices, a logical volume pair to be a copy execution target is searched for. With this, the copy execution target is determined in such a manner as to reduce the variation in the number of copy unexecuted logical volumes among the memory devices. This in turn prevents, in only particular memory devices, multiple logical volumes from being left without copy execution at the final stage of the data copy processing between the storage apparatuses.

Note that a variation in the number of copy unexecuted logical volumes among multiple memory devices in a storage apparatus is found, for example, as the standard deviation or variance of the number of logical volumes, which belong to the copy unexecuted logical volume pairs, in each of the multiple memory devices. Alternatively, the difference between the maximum value and the minimum value in terms of the number of logical volumes, which belong to the copy unexecuted logical volume pairs, in each of the multiple memory devices may be used as the variation in the number of copy unexecuted logical volumes among the multiple memory devices in the storage apparatus.

In addition, the determining unit 1-1b may select a memory device based on the number of logical volumes being in execution of copy processing in each memory device. For example, first, the determining unit 1-1b preferentially selects, from among each of the storage apparatuses 1 and 2, a memory device including a smaller number of logical volumes specified as copy sources or copy destinations compared to other memory devices of the storage apparatus. Then, if there are two or more memory devices including the same number of logical volumes specified as copy sources or copy destinations, the determining unit 1-1b preferentially selects a memory device including a larger number of logical volumes which belong to copy unexecuted logical volume pairs compared to other memory devices of the storage apparatus. If a logical volume pair whose copy source or copy destination is a logical volume of a memory device which has another logical volume being in execution of copy processing is determined as a copy execution target, access concentration to the memory device occurs. By selecting a memory device according to the number of logical volumes being in execution of copy processing, it is possible to adequately prevent the occurrence of access concentration, which improves efficiency in data copy processing.

Note that, in the example of FIG. 1, the control device 1-1 is provided in the storage apparatus 1 which is a data copy destination, however, the control device 1-1 may be provided in another apparatus. For example, the control device 1-1 may be provided in the storage apparatus 2 which is a data copy source. Alternatively, the control device 1-1 may be provided in the terminal 3. In that case, the copy unit 1-1c achieves data copy, for example, by remotely controlling the storage apparatuses 1 and 2.

(b) Second Embodiment

Next described is a second embodiment. The second embodiment is directed to a storage apparatus equipped with a data migration mechanism. Providing the data migration mechanism in the storage apparatus enables data migration without a host computer. For example, an administrator who carries out data migration prepares, as a data transfer destination storage apparatus, a storage apparatus having the data migration mechanism. Further, the administrator connects the data transfer destination storage apparatus and a data transfer source storage apparatus using communication cables. Subsequently, the administrator inputs a data transfer instruction to the data transfer destination storage apparatus. In response to the data transfer instruction, the data transfer destination storage apparatus reads appropriate data from the data transfer source storage apparatus and stores the data in volumes incorporated in the data transfer destination storage apparatus. At this point, the data transfer destination storage apparatus achieves efficient data migration effectively using multiple communication paths.

Figure 4:
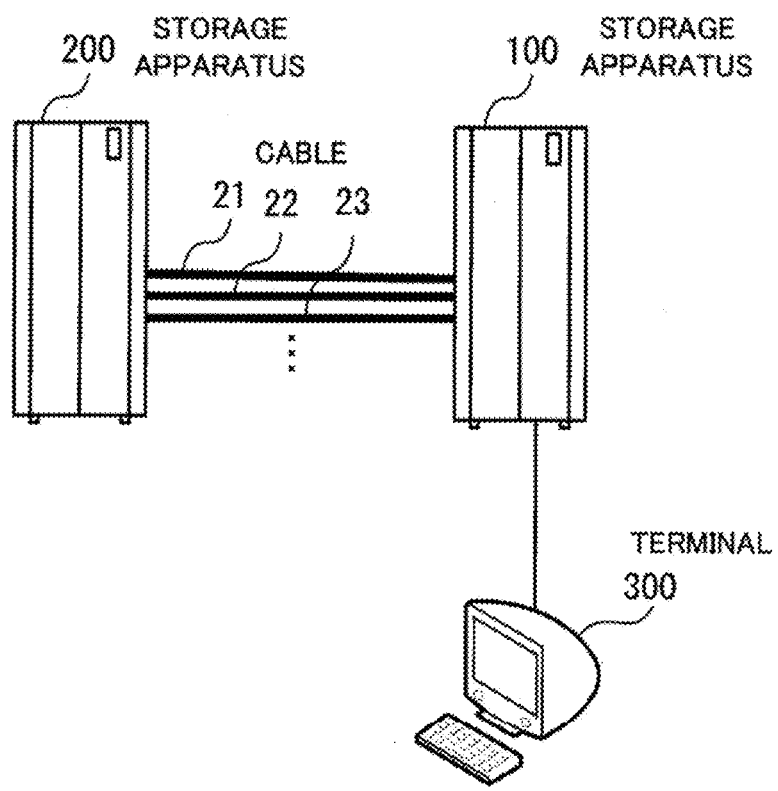
FIG. 4 illustrates an example of a system configuration according to a second embodiment.

FIG. 4 illustrates an example of a system configuration according to the second embodiment. Two storage apparatuses 100 and 200 are connected with multiple cables 21, 22, 23, and .... One cable forms one path for data communication between the storage apparatuses 100 and 200. The storage apparatuses 100 and 200 are able to store data using, for example, RAID (redundant array of inexpensive disks) technology. In addition, the storage apparatuses 100 and 200 record data, for example, in a Count, Key, and Data (CKD) format. In addition, the storage apparatuses 100 and 200 may record data in a Fixed Block Architecture (FBA) format.

Assume in the example of FIG. 4 that the storage apparatus 100 is a data transfer destination and the storage apparatus 200 is a data transfer source. According to the second embodiment, data transfer is implemented by the transfer destination storage apparatus 100 performing a process of reading out data from volumes of the storage apparatus 200. To the transfer destination storage apparatus 100, a terminal 300 is connected. The terminal 300 is an example of a man-machine interface used by a system administrator. Using the terminal 300, the administrator inputs a data transfer instruction to the storage apparatus 100. The terminal 300 and the storage apparatus 100 may be directly connected to each other by, for example, a local area network (LAN) cable, or may be connected via a LAN switch. In the second embodiment, the data transfer destination storage apparatus 100 reads out data from the transfer source storage apparatus 200 which holds the data, and then stores the data in logical volumes under the management of the storage apparatus 100.

Figure 5:
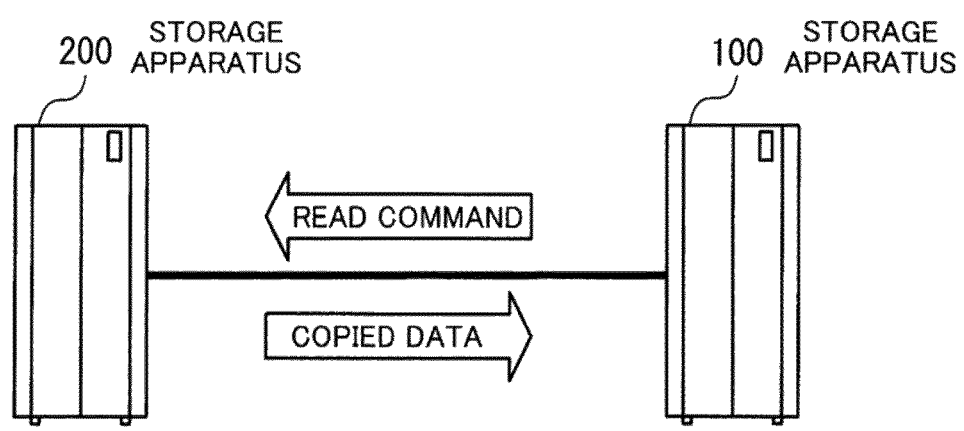
FIG. 5 illustrates communication between storage apparatuses at the time of data transfer.

FIG. 5 illustrates communication between storage apparatuses at the time of data transfer. As illustrated in FIG. 5, a data read command is transmitted from the storage apparatus 100 to the storage apparatus 200. In response to the read command, copied data is transmitted from the storage apparatus 200 to the storage apparatus 100. Such transmission of a read command and copied data is performed in parallel in individual paths.

Figure 6:
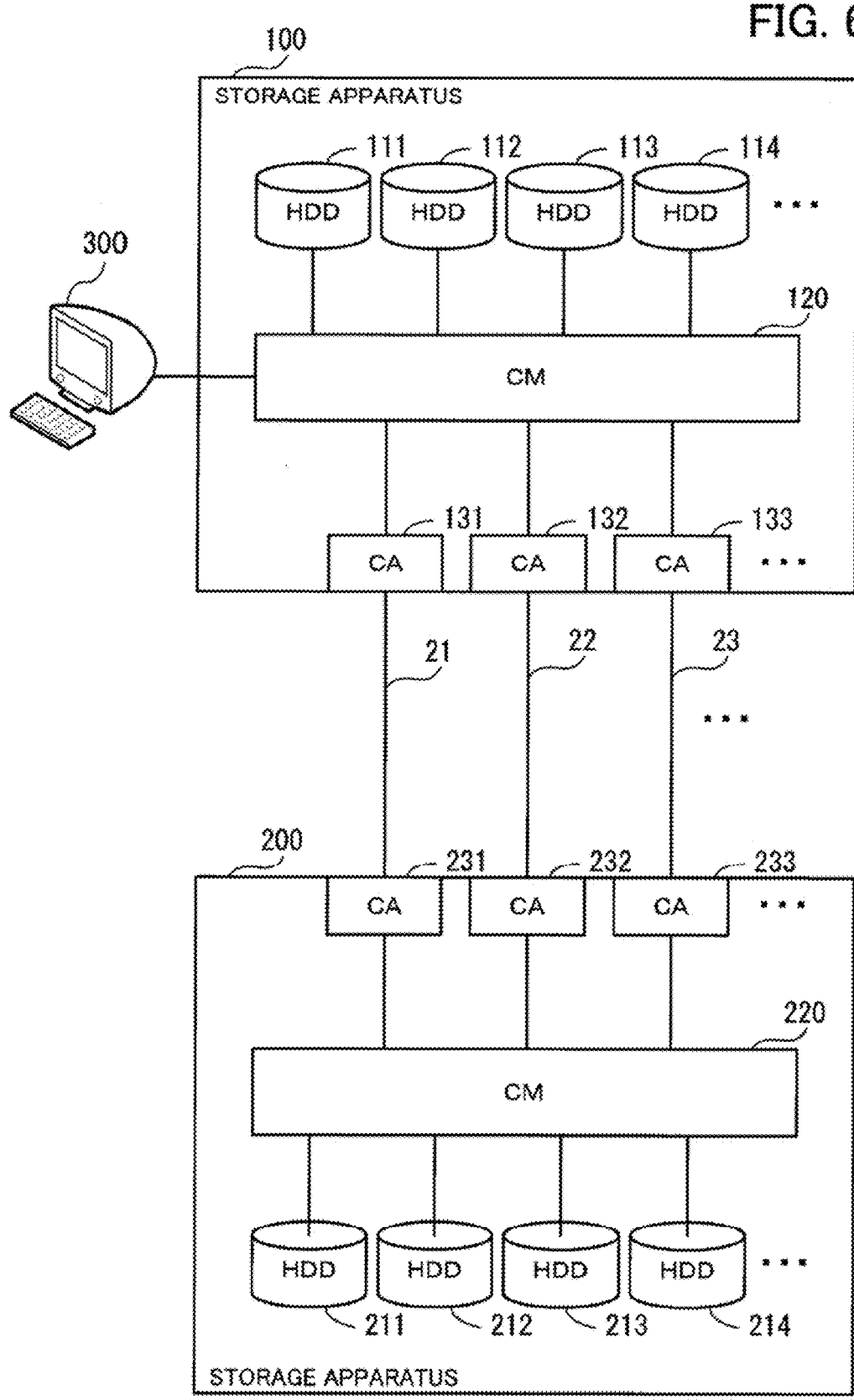
FIG. 6 illustrates an example of hardware configurations of the storage apparatuses.

Next described are hardware configurations of individual apparatuses for achieving such data transfer. FIG. 6 illustrates an example of hardware configurations of storage apparatuses. The storage apparatus 100 includes multiple hard disk drives (HDDs) 111, 112, 113, 114, and ..., a controller module (CM) 120, and multiple channel adapters (CAs) 131, 132, 133, and ....

The HDDs 111, 112, 113, 114, and ... store data. For example, multiple HDDs may form one RAID group. A RAID group may be treated as one disk. Further, in a RAID group, logical volumes called logical units (LUs) may be created. According to the second embodiment, one RAID group is one disk, and LUs in a RAID group are volumes to be targets for data transfer.

The CM 120 controls the entire storage apparatus 100. For example, the CM 120 is connected to the HDDs 111, 112, 113, 114, and ..., and performs data input and output operations with the HDDs 111, 112, 113, 114, and .... In addition, the CAs 131, 132, 133, and ... are connected to the CM 120, and the CM 120 performs data communication with an external apparatus via the CAs 131, 132, 133, and .... Further, the CM 120 is connected to the terminal 300. The CM 120 acquires various instructions, such as a data transfer instruction, from the terminal 300 and transmits, to the terminal 300, processing results according to instructions.

The CAs 131, 132, 133, and ... perform communication with a host computer and the other storage apparatus 200 using fiber channels. In addition, the CAs 131, 132, 133, and ... have a function of issuing control commands, such as a data readout request, to apparatuses connected therewith. For example, the CAs 131, 132, 133, and ... issue commands in Channel Command Word (CCW). In the second embodiment, the CAs 131, 132, 133, and ... of the transfer destination storage apparatus 100 are connected to CAs 231, 232, 233, and ..., respectively, by individual cables 21, 22, 23, and ....

As is the case with the storage apparatus 100, the storage apparatus 200 includes multiple HDDs 211, 212, 213, 214, and ..., a CM 220, and multiple CAs 231, 232, 233, and .... In the HDDs 211, 212, 213, 214, and ... of the storage apparatus 200, data to be transfer targets is stored. Note that, in the example of FIG. 6, the HDDs are used as storage media, however, a different type of storage media may be used in place of the HDDs. For example, solid state drives (SSDs) may be used in the storage apparatuses 100 and 200 in place of the HDDs.

Figure 7:
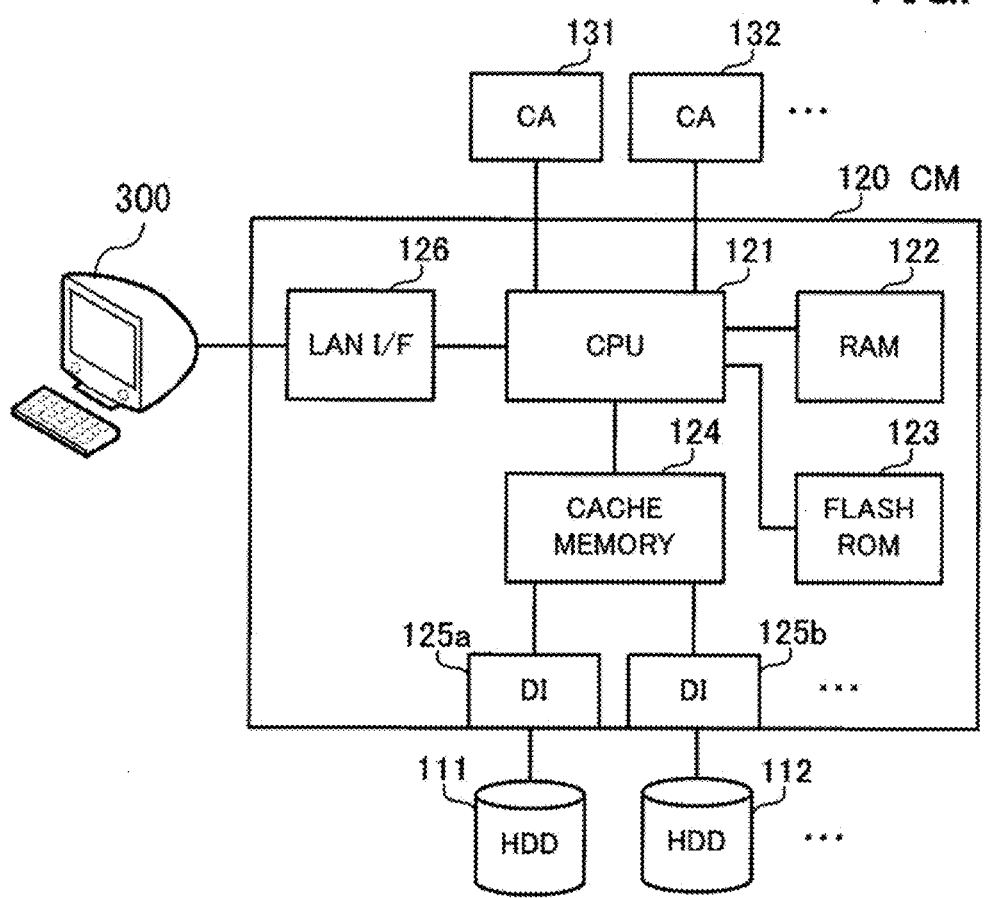
FIG. 7 illustrates an example of an internal configuration of a CM.

Next described is an internal configuration of the CM 120. FIG. 7 illustrates an example of an internal configuration of a CM. The CM 120 includes a central processing unit (CPU) 121, a random access memory (RAM) 122, a flash read only memory (ROM) 123, a cache memory 124, device interfaces (DIs) 125a, 125b, and ..., and a LAN interface (I/F) 126. The CPU 121 exercises overall control over the entire CM 120 by executing a program stored in the flash ROM 123 or the like. The RAM 122 temporarily stores at least part of a program to be executed by the CPU 121 and various types of data required for processing implemented by the program. The flash ROM 123 stores the program to be executed by the CPU 121 and various types of data required for implementation of the program. The cache memory 124 caches data read from the HDDs 111, 112, and . . . . In addition, the cache memory 124 may temporarily store data required for processing performed by the CPU 121. The DIs 125a, 125b, and . . . provide interface functions to transmit and receive data between the cache memory 124 and the HDDs 111, 112, and . . . , respectively. The LAN interface 126 is connected to an external apparatus, such as the terminal 300, via a LAN cable, and performs data transmission and reception with the external apparatus.

Figure 8:
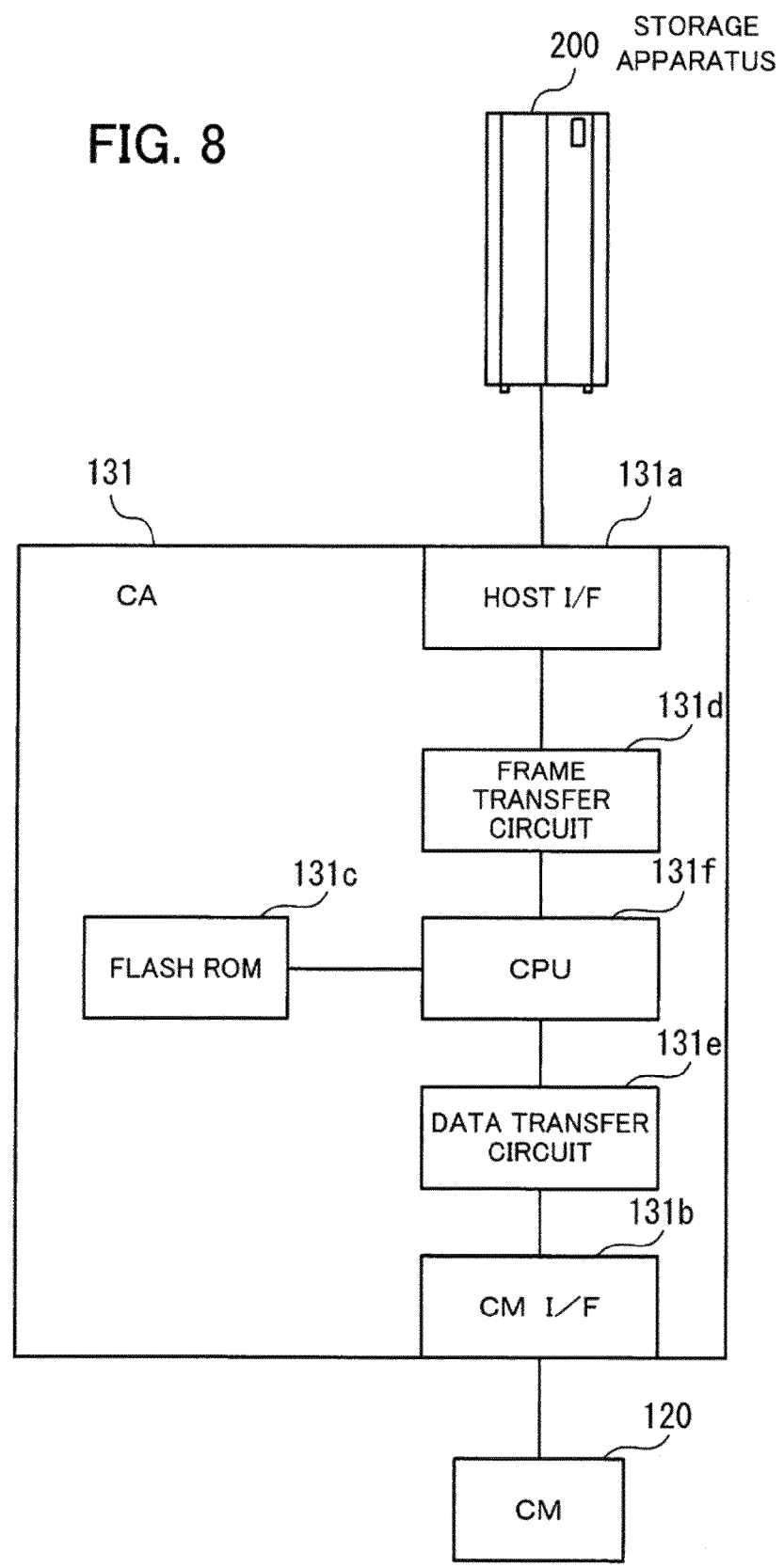
FIG. 8 illustrates an example of an internal configuration of a CA.

Next described is an internal configuration of each CA. FIG. 8 illustrates an example of an internal configuration of a CA. The CA 131 includes a host I/F 131a, a CM I/F 131b, a flash ROM 131c, a frame transfer circuit 131d, a data transfer circuit 131e, and a CPU 131f.

The host I/F 131a is an interface for performing communication with the host computer and the other storage apparatus 200 using a fiber channel. The CM I/F 131b is an interface for performing communication with the CM 120. The flash ROM 131c stores firmware for controlling the CA 131. For example, the flash ROM 131c stores a program related to processing for issuing data read commands in CCW and a program related to processing corresponding to a received command in CCW.

The frame transfer circuit 131d transmits and receives frames via the host I/F 131a. For example, the frame transfer circuit 131d extracts data from a frame received via the host I/F 131a and transfers the data to the data transfer circuit 131e via the CPU 131f. In addition, the frame transfer circuit 131d generates a frame including data received from the data transfer circuit 131e and transfers the frame to the host I/F 131a. In addition, on receiving a request for performing data transfer processing from the CM 120, the frame transfer circuit 131d transmits a data read command to the storage apparatus 200 based on an instruction of the CPU 131f. The frame transfer circuit 131d transfers, to the data transfer circuit 131e via the CPU 131f, data sent from the storage apparatus 200 in response to the data read command.

The data transfer circuit 131e performs data transfer between the CM 120 and the frame transfer circuit 131d. For example, on receiving data from the CM 120 via the CM I/F 131b, the data transfer circuit 131e transfers the data to the frame transfer circuit 131d via the CPU 131f. In addition, on receiving data from the frame transfer circuit 131d via the CPU 131f, the data transfer circuit 131e transfers the data to the CM 120 via the CM I/F 131b.

The CPU 131f controls operations of the frame transfer circuit 131d and the data transfer circuit 131e, as well as relays data transfer between the frame transfer circuit 131d and the data transfer circuit 131e. For example, on receiving a request for performing data transfer processing from the CM 120, the CPU 131f instructs the frame transfer circuit 131d to transmit a data read command to the storage apparatus 200 according to firmware stored in the flash ROM 131c.

Note that FIG. 8 illustrates an example of the hardware configuration of the CA 131 only, however, each of the remaining CAs of the storage apparatuses 100 and 200 has the same hardware configuration as that of the CA 131.

Figure 9:
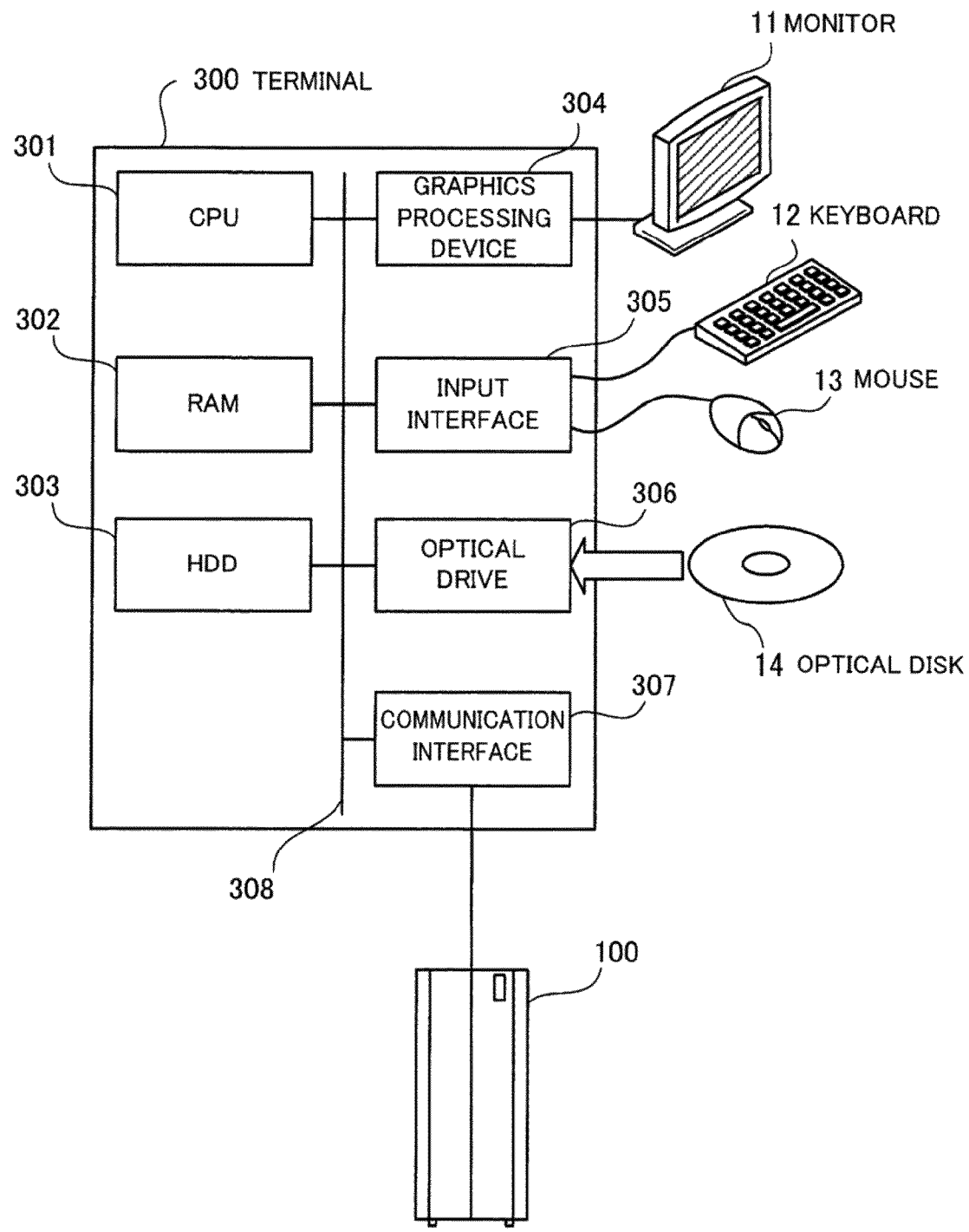
FIG. 9 illustrates an example of a hardware configuration of a terminal used in the second embodiment.

Next described is a hardware configuration of the terminal 300. FIG. 9 illustrates an example of a hardware configuration of a terminal used in the second embodiment. As for the terminal 300, overall control is controlled by a CPU 301. To the CPU 301, a RAM 302 and multiple peripherals are connected via a bus 308.

A RAM 302 is used as a main memory device of the terminal 300. The RAM 302 temporarily stores at least part of an operating system (OS) program and application programs to be executed by the CPU 301. In addition, the RAM 302 stores various types of data required for processing performed by the CPU 301.

Peripherals connected to the bus 308 includes an HDD 303, a graphics processing device 304, an input interface 305, an optical drive 306, and a communication interface 307.

The HDD 303 magnetically writes and reads data to and from a built-in disk. The HDD 303 is used as a secondary memory device of the terminal 300. The HDD 303 stores an OS program, application programs, and various types of data. Note that, as a secondary memory device, a semiconductor memory device such as a flash memory may also be used.

To the graphics processing device 304, a monitor 11 is connected. The graphics processing device 304 displays an image on the screen of a monitor 11 according to a command from the CPU 301. The monitor 11 may be a display device using a cathode ray tube (CRT) or a liquid crystal display.

To the input interface 305, a keyboard 12 and a mouse 13 are connected. The input interface 305 transmits signals sent from the keyboard 12 and the mouse 13 to the CPU 301. Note that the mouse 13 is an example of a pointing device, and another type of pointing device may be used. Other types of pointing devices include a touch panel, a tablet, a touch-pad, and a trackball.

The optical drive 306 reads data recorded on an optical disk 14 using laser light or the like. The optical disk 14 is a portable recording medium on which data is recorded in such a manner as to be read by reflecting light. The optical disk 14 may be a digital versatile disc (DVD), a DVD-RAM, a compact disc read only memory (CD-ROM), a compact disc recordable (CD-R), and a compact disc rewritable (CD-RW).

The communication interface 307 performs data transmission and reception with the storage apparatus 100 via a network, such as a LAN.

The hardware configuration described above achieves the processing functions of the second embodiment. Note that a drive for performing read and write operations on a portable magnetic disk, such as a flexible disk (FD), may be connected to the terminal 300 of FIG. 9 as a peripheral. In addition, the storage apparatus of the first embodiment may be achieved using the same hardware as the storage apparatus 100 illustrated in FIGS. 6 to 8.

Figure 10:
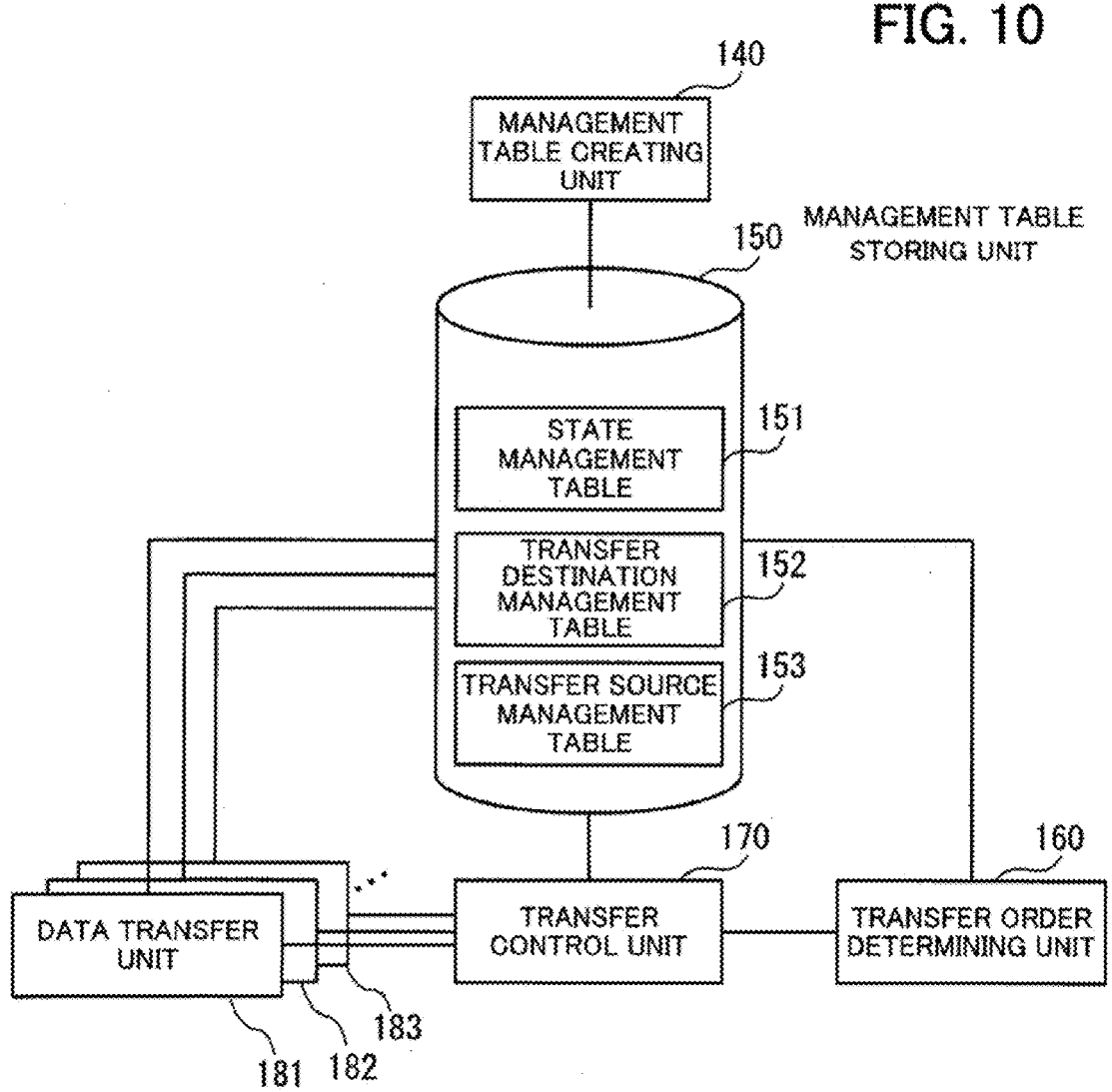
FIG. 10 is a block diagram illustrating a data migration function of a storage apparatus.

Next described is a data migration function of the storage apparatus 100. FIG. 10 is a block diagram illustrating a data migration function of a storage apparatus. The storage apparatus 100 includes a management table creating unit 140, a management table storing unit 150, a transfer order determining unit 160, a transfer control unit 170, and multiple data transfer units 181, 182, 183, and . . . .

According to a data transfer instruction input from the terminal 300, the management table creating unit 140 creates management tables to be used for data transfer. The input data transfer instruction includes, for example, transfer information indicating a correspondence relationship between data transfer source LUs and data transfer destination LUs.

Based on the transfer information, the management table creating unit 140 creates a state management table 151, a transfer destination management table 152, and a transfer source management table 153. The state management table 151 is a data table indicating a transfer state of each pair made of a transfer destination LU and a transfer source LU (hereinafter referred to as "transfer pair"). Types of transfer states are, for example, "waiting for transfer", "transfer in progress", and "transfer completed". The transfer destination management table 152 is a data table indicating a transfer processing status of each disk which includes one or more LUs to be transfer destinations. The transfer source management table 153 is a data table indicating a transfer processing status of each disk which includes one or more LUs to be transfer sources. The transfer processing statuses related to the transfer destination and source disks are indicated, for example, by the number of LUs in the state of "waiting for transfer" and the number of LUs in the state of "transfer in progress".

The management table storing unit 150 stores the state management table 151, the transfer destination management table 152, and the transfer source management table 153. The state management table 151, the transfer destination management table 152, and the transfer source management table 153 are created by the management table creating unit 140, and the content of each table is updated by the transfer control unit 170. As the management table storing unit 150, a part of the storage area in the RAM 122 of the CM 120 is used, for example.

Based on information stored in the management table storing unit 150, the transfer order determining unit 160 determines a transfer pair to start data transfer processing.

Based on information stored in the management table storing unit 150, the transfer control unit 170 performs data transfer processing between LUs. For example, the transfer control unit 170 sorts records of the individual transfer destination management table 152 and transfer source management table 153 accordingly. Subsequently, to the transfer order determining unit 160, the transfer control unit 170 transmits a request for determining, based on the sorting result, a transfer pair to be a target for starting transfer. In addition, the transfer control unit 170 transmits, to one of the data transfer units 181, 182, 183, and . . . , an instruction of data transfer between the determined transfer pair.

The data transfer units 181, 182, 183, and . . . are provided as many as the number of data communication paths connected to the storage apparatus 200. On receiving a data transfer start instruction which specifies a transfer pair, each of the data transfer units 181, 182, 183, and . . . performs data transfer between the specified transfer pair using an unused path. For example, each of the data transfer units 181, 182, 183, and . . . controls a CA to transmit a read request to read data stored in a transfer source LU of the specified transfer pair to the storage apparatus 200 and write data sent in response to the read request in a transfer destination LU of the specified transfer pair. In addition, each of the data transfer units 181, 182, 183, and . . . monitors progress of data copy performed by the CA, and updates information in the management table storing unit 150 according to the data copy progress.

Among the individual components of FIG. 10, the management table creating unit 140, the transfer order determining unit 160, and the transfer control unit 170 are functions implemented, for example, by the CPU 121 of the CM 120. In addition, the management table storing unit 150 is a function implemented, for example, by the RAM 122 of the CM 120. Further, the data transfer units 181, 182, 183, and . . . are functions implemented, for example, by coordinated operations of the CPU 121 of the CM 120 and the CAs 131, 132, 133, . . . , respectively.

Note that, in FIG. 10, each line connecting the individual components represents a part of communication paths, and communication paths other than those illustrated in FIG. 10 are also configurable. In addition, the management table creating unit 140 is an example of the acquiring unit 1-1a of the first embodiment illustrated in FIG. 1. The function obtained by combining the transfer order determining unit 160 and the transfer control unit 170 is an example of the determining unit 1-1b of the first embodiment illustrated in FIG. 1. The data transfer units 181, 182, 183, and . . . are an example of the copy unit 1-1c of the first embodiment illustrated in FIG. 1.

Next described is transfer information included in a data transfer instruction. FIG. 11 illustrates an example of a data structure of transfer information. Transfer information 31 has columns of transfer destination and transfer source. In the transfer information 31, information registered in each row indicates a transfer pair. Set in the transfer destination column are information indicating transfer destination LUs. The transfer destination column is further divided into columns of ID and LU number (LUN). Set in the ID column are identifiers (IDs) of disks, each including a corresponding transfer destination LU, in the storage apparatus 100. Set in the LUN column are identification numbers of individual transfer destination LUs in corresponding disks. Set in the transfer source column are information indicating transfer source LUs. The transfer source column is further divided into columns of ID and LU number (LUN). Set in the ID column are identifiers (IDs) of disks, each including a corresponding transfer source LU, in the storage apparatus 200. Set in the LUN column are identification numbers of individual transfer source LUs in corresponding disks. Based on the transfer information 31 of FIG. 11, the state management table 151, the transfer destination management table 152, and the transfer source management table 153 are created by the management table creating unit 140.

Figure 12:
FIG. 12 illustrates an example of a data structure of a state management table.

FIG. 12 illustrates an example of a data structure of a state management table. In the state management table 151, columns of transfer destination, transfer source, and state are provided. In the transfer destination and transfer source columns, the content of the transfer information 31 included in a data transfer instruction is set. Set in the state column are states of individual transfer pairs indicated in the transfer information 31. In the case where a transfer pair is waiting for data transfer, a term "READY" is set in a corresponding field of the state column. In the case where a transfer pair is executing data transfer, a term "USING" is set in a corresponding field of the state column. In the case where data transfer of a transfer pair is completed, a term "FINISHED" is set in a corresponding field of the state column. When the state management table 151 is created, the management table creating unit 140 sets "READY", which is an initial state of a transfer pair, in the fields of the state column for all transfer pairs.

FIG. 13 is an example of a data structure of a transfer destination management table. In the transfer destination management table 152, columns of ID, total number, READY count, and USING count are provided. Set in the ID column are identifiers of individual disks (disk IDs) provided in the transfer destination storage apparatus 100. Set in each field of the total number column is the count of LUs specified as data transfer destinations among LUs in a disk indicated by a corresponding disk ID. Set in each field of the READY count column is the count of LUs in the state of "waiting for data transfer" among the LUs specified as data transfer destinations in a disk indicated by a corresponding disk ID. Set in each field of the USING count column is the count of LUs in the state of "data transfer in progress" among the LUs specified as data transfer destinations in a disk indicated by a corresponding disk ID.

Each numerical value in the total number column is obtained by adding up the number of times an ID of a corresponding disk appears in the transfer destination column of the transfer information 31. Each initial entry in the READY count column is the same as the numerical value of a corresponding total number. Initial entries in the USING count column are all "0".

Figure 14:
FIG. 14 illustrates an example of a data structure of a transfer source management table.

FIG. 14 illustrates an example of a data structure of a transfer source management table. In the transfer source management table 153, columns of ID, total number, READY count, and USING count are provided. Set in the ID column are identifiers of individual disks (disk IDs) provided in the transfer source storage apparatus 200. Set in each field of the total number column is the count of LUs specified as data transfer sources among LUs in a disk indicated by a corresponding disk ID. Set in each field of the READY count column is the count of LUs in the state of "waiting for data transfer" among the LUs specified as data transfer sources in a disk indicated by a corresponding disk ID. Set in each field of the USING count column is the count of LUs in the state of "data transfer in progress" among the LUs specified as data transfer sources in a disk indicated by a corresponding disk ID.

Each numerical value in the total number column is obtained by adding up the number of times an ID of a corresponding disk appears in the transfer source column of the transfer information 31. Each initial entry in the READY count column is the same as the numerical value of a corresponding total number. Initial entries in the USING count column are all "0".

Based on such data tables, the data transfer processing is performed. Next described is a procedure of the data transfer processing.

Figure 15:
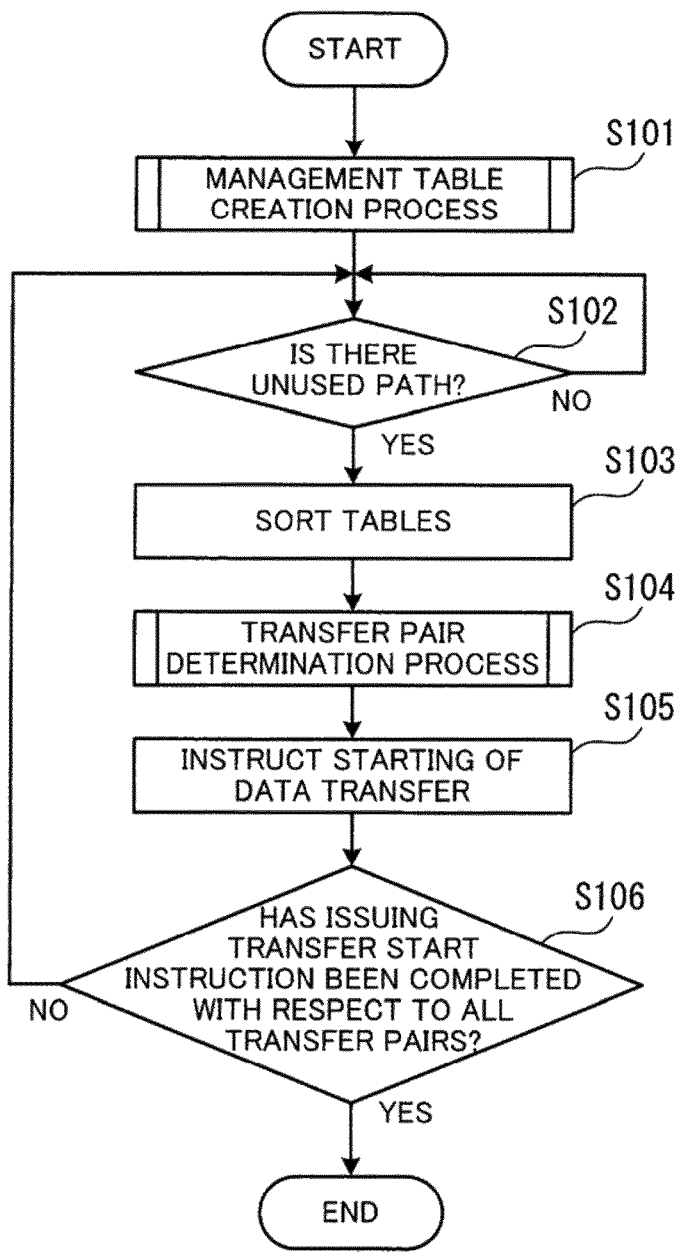
FIG. 15 is a flowchart illustrating an example of a procedure of data transfer processing.

FIG. 15 is a flowchart illustrating an example of a procedure of data transfer processing. The processing of FIG. 15 is described next according to the step numbers. The data transfer processing is started, for example, in response to an input of a data transfer instruction which includes transfer information.

[Step S101] The management table creating unit 140 performs a management table creation process. Details of the process are described later (see FIG. 16).

[Step S102] The transfer control unit 170 determines whether there is an unused path. For example, the count of cables connecting the storage apparatuses 100 and 200 is the total number of paths. The transfer control unit 170 refers to the state management table 151, and determines that there is an unused path if the count of transfer pairs in the state of "USING" falls short of the total number of paths. On the other hand, the transfer control unit 170 determines that there is no unused path if the count of transfer pairs in the state of "USING" has reached the total number of paths. If there is an unused path, the transfer control unit 170 proceeds the processing to Step S103. On the other hand, if there is no unused path, the transfer control unit 170 repeats the process of Step S102 and waits until a path becomes available.

[Step S103] The transfer control unit 170 sorts each of the transfer destination management table 152 and the transfer source management table 153. For example, the transfer control unit 170 sorts each of the transfer destination management table 152 and the transfer source management table 153 in such a manner that, for example, disks appearing in each of the tables 152 and 153 are listed in ascending order of the USING count. In addition, the transfer control unit 170 sorts each of the transfer destination management table 152 and the transfer source management table 153 in such a manner that disks appearing in each of the tables 152 and 153 are listed in descending order of the READY count.

Further, the transfer control unit 170 is able to sort each of the transfer destination management table 152 and the transfer source management table 153 according to the combination of the USING count and the READY count. For example, the transfer control unit 170 first sorts the disks appearing in each of the tables 152 and 153 according to the USING count, and then sorts disks having the same value of the USING count according to the READY count. Assume in the second embodiment that the transfer control unit 170 performs sorting according to the combination of the USING count and the READY count.

[Step S104] The transfer order determining unit 160 performs a transfer pair determination process. The transfer pair determination process is a process for determining a transfer pair for which data transfer is started. For example, after finishing sorting of the transfer destination management table 152 and the transfer source management table 153, the transfer control unit 170 transmits a transfer pair determining request to the transfer order determining unit 160. In response to the transfer pair determining request from the transfer control unit 170, the transfer order determining unit 160 determines a transfer pair which is a transfer start target. Details of the transfer pair determination process are described later (see FIG. 19).

[Step S105] The transfer control unit 170 transmits, to a data transfer unit not executing data transfer, a data transfer start instruction which specifies a transfer pair to be a transfer start target. The data transfer unit which has received the data transfer start instruction starts a data transfer process between the specified transfer pair. Details of the data transfer process between the specified transfer pair are described later (see FIG. 23).

[Step S106] The transfer control unit 170 determines whether issuing the transfer start instruction has been completed with respect to all transfer pairs. For example, the transfer control unit 170 determines that issuing the transfer start instruction has been completed with respect to all transfer pairs when all the transfer pairs registered in the state management table 151 enter the state of either "USING" or "FINISHED". In the case where issuing the transfer start instruction has been completed with respect to all transfer pairs, the transfer control unit 170 ends the processing. On the other hand, if there is one or more transfer pairs to which the transfer start instruction has yet to be issued, the transfer control unit 170 proceeds the processing to Step S102.

In the above-described manner, the transfer start instruction is issued. The management table creation process is next described in detail.

Figure 16:
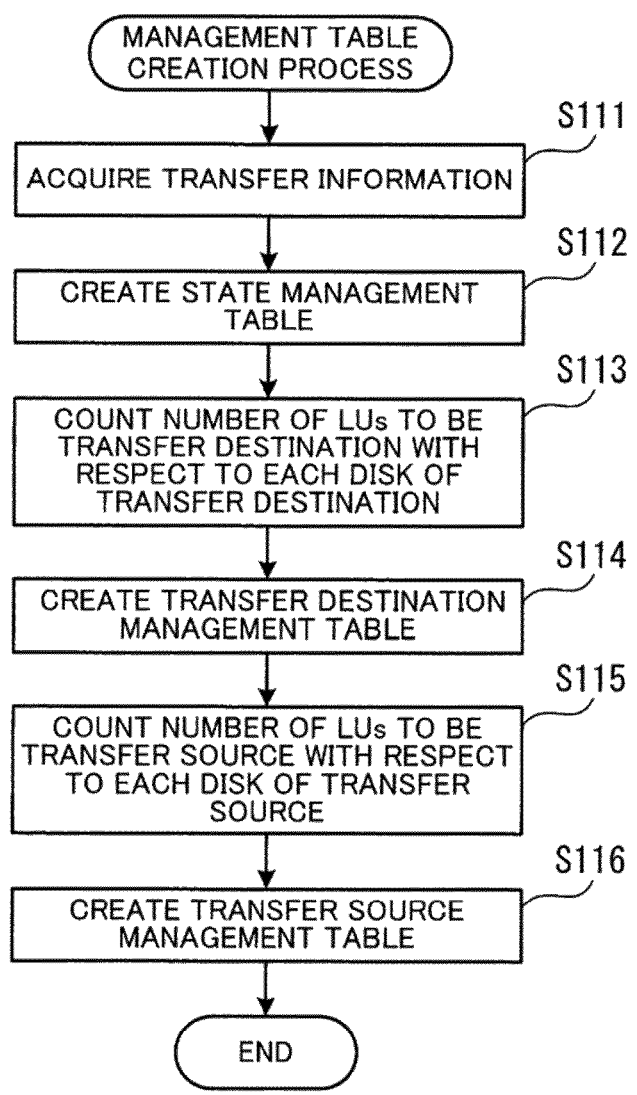
FIG. 16 is a flowchart illustrating a procedure of a management table creation process.

FIG. 16 is a flowchart illustrating a procedure of a management table creation process. The process of FIG. 16 is described next according to the step numbers.

[Step S111] The management table creating unit 140 acquires transfer information. For example, the management table creating unit 140 acquires transfer information from a transfer instruction.

[Step S112] The management table creating unit 140 creates the state management table 151. For example, the management table creating unit 140 adds a column of state to the transfer information and sets the state of "READY" for each transfer pair. The management table creating unit 140 stores the created state management table 151 in the management table storing unit 150.

[Step S113] The management table creating unit 140 counts the number of LUs to be transfer destinations with respect to each disk in the transfer destination storage apparatus 100. For example, the management table creating unit 140 extracts IDs from the transfer destination column in the acquired transfer information and counts the number of times each ID is extracted.

[Step S114] The management table creating unit 140 creates the transfer destination management table 152. For example, the management table creating unit 140 sets, in the ID column of the transfer destination management table 152, IDs set in the transfer destination column of the transfer information. Subsequently, the management table creating unit 140 sets, in a field corresponding to an ID of each disk in the total number column of the transfer destination management table 152, the number of LUs to be transfer destinations counted for the disk in Step S113. Further, the management table creating unit 140 sets, in each field of the READY count column in the transfer destination management table 152, the same value as a corresponding total number. Then, the management table creating unit 140 sets "0" in all fields of the USING count column in the transfer destination management table 152. Subsequently, the management table creating unit 140 stores the created transfer destination management table 152 in the management table storing unit 150.

[Step S115] The management table creating unit 140 counts the number of LUs to be transfer sources with respect to each disk in the transfer source storage apparatus 200. For example, the management table creating unit 140 extracts IDs from the transfer source column in the acquired transfer information and counts the number of times each ID is extracted.

[Step S116] The management table creating unit 140 creates the transfer source management table 153. For example, the management table creating unit 140 sets, in the ID column of the transfer source management table 153, IDs set in the transfer source column of the transfer information. Subsequently, the management table creating unit 140 sets, in a field corresponding to an ID of each disk in the total number column of the transfer source management table 153, the number of LUs to be transfer sources counted for the disk in Step S115. Further, the management table creating unit 140 sets, in each field of the READY count column in the transfer source management table 153, the same value as a corresponding total number. Then, the management table creating unit 140 sets "0" in all fields of the USING count column in the transfer source management table 153. Subsequently, the management table creating unit 140 stores the created transfer source management table 153 in the management table storing unit 150.

In the above-described manner, the state management table 151, the transfer destination management table 152, and the transfer source management table 153 are stored in the management table storing unit 150. The created transfer destination management table 152 and transfer source management table 153 are individually sorted by the transfer control unit 170.

FIG. 17 illustrates a first sorting example of a transfer destination management table. FIG. 17 illustrates a sorting example of the transfer destination management table 152 in an initial state. In the transfer destination management table 152 in the initial state, the USING count is "0" for all the disks. Therefore, it makes no sense to sort the transfer destination management table 152 according to the USING count. Hence, sorting is performed according to the READY count. In the example of FIG. 17, the records in the transfer destination management table 152 are sorted in descending order of the READY count. After the sorting, row numbers in ascending order are set in a priority order for the individual records.

FIG. 18 illustrates a second sorting example of the transfer destination management table. The example of FIG. 18 illustrates a sorting process at a halfway stage of the data transfer processing. At the halfway stage of the data transfer processing, there are transfer pairs being in the execution of data transfer. As for a disk indicated by a corresponding ID, the disk to which a transfer destination LU of each transfer pair being in the execution of data transfer belongs, "1" is set in the USING count. Accordingly, the individual records of the transfer destination management table 152 is first sorted in ascending order of the USING count. Then, records having the same USING count are sorted in descending order of the READY count.

Note that FIGS. 17 and 18 illustrate sorting examples of the transfer destination management table 152, however, the transfer source management table 153 is also sorted in the same processing. Sorting the tables 152 and 153 in the above-described manner allows a higher priority to be given to the records having smaller USING counts (that is, less disk competition) and larger READY counts. That is, as illustrated in FIG. 18, the records in the transfer destination management table 152 are first sorted in ascending order of the USING count. Then, at the time of determining a transfer pair, whether data transfer has been started is checked for the individual records beginning at the top of the transfer destination management table 152. With this, a transfer pair including an LU which belongs to a disk having a smaller number of LUs being in the execution of data transfer is preferentially determined as a transfer start target. This prevents particular disks from being doubly subjected to data transfer.

In addition, as illustrated in FIGS. 17 and 18, a record of a disk having a larger number of LUs in a transfer waiting state appears higher up in the transfer destination management table 152. With this, a transfer pair including an LU which belongs to a disk having a larger number of LUs in a transfer waiting state is preferentially determined as a data transfer start target. As a result, data transfer of LUs which belong to disks each having a larger number of LUs in a transfer waiting state is preferentially performed, which in turn prevents LUs in a transfer waiting state from being concentrated to particular disks at the final stage of the data transfer processing. For example, if data transfer is uniformly performed for each disk, LUs which belong to disks each having a larger number of the TOTAL number are left in a transfer waiting state at the final stage of the data transfer processing. For example, in the example of FIG. 17, some LUs in the disks with the IDs "F" and "G" are left in a transfer waiting state at the end. Assume here that there are three paths, for example. In the case where all three paths are used, competition in transfer destinations occurs in either one of the disks with the IDs "F" and "G". On the other hand, if competition in transfer destinations is completely prohibited, the paths are partially not used at the final stage of the data transfer processing, which reduces the processing efficiency. According to the second embodiment, the sorting processes illustrated in FIGS. 17 and 18 reduce a difference in the ending time among the individual disks. This prevents the occurrence of access concentration to particular disks and the occurrence of unused paths at the final stage of the data transfer processing.

Figure 19:
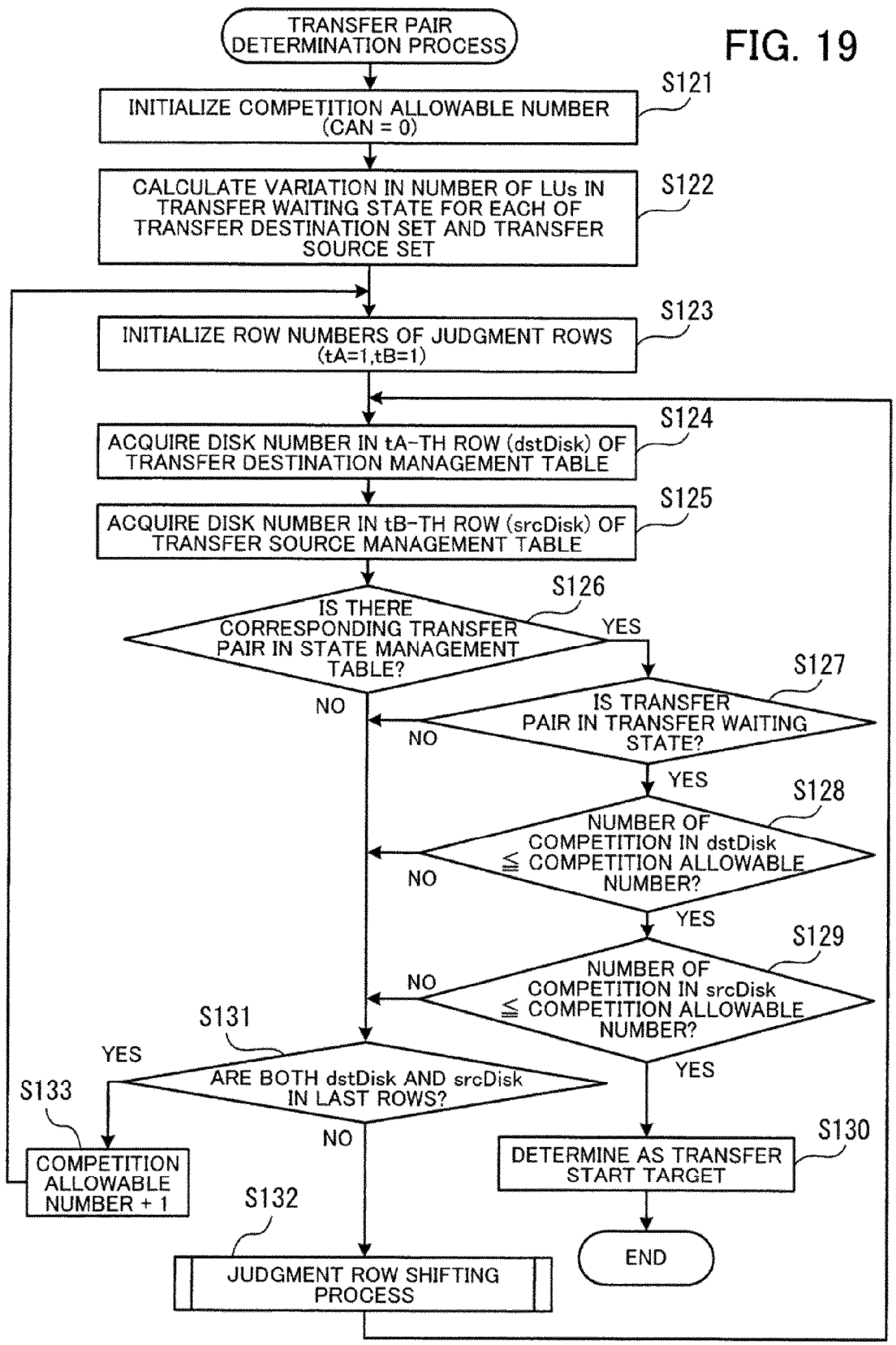
FIG. 19 is a flowchart illustrating a procedure of a transfer pair determination process.

Next described is a procedure of the transfer pair determination process. FIG. 19 is a flowchart illustrating a procedure of a transfer pair determination process. The process of FIG. 19 is described next according to the step numbers.

[Step S121] The transfer order determining unit 160 initializes a competition allowable number (CAN). For example, the transfer order determining unit 160 internally holds a variable which indicates the competition allowable number, and sets the variable to "0". Note that the variable indicating the competition allowable number is stored, for example, in a storage area in the RAM 122, which storage area is managed by the transfer order determining unit 160.

[Step S122] With respect to each of the transfer destination set (i.e., a collection of all LUs included in the transfer destination management table 152) and the transfer source set (a collection of all LUs included in the transfer source management table 153), the transfer order determining unit 160 calculates a variation in the number of LUs in a transfer waiting state for each disk. The variation in the number of LUs in a transfer waiting state is used in a judgment row shifting process (Step S132).

That is, in the process from Step S123 onward, one row each is specified in the transfer destination management table 152 and the transfer source management table 153 as a judgment target. Subsequently, it is determined whether to start data transfer between disks corresponding to IDs which are indicated in the two rows of the judgment targets. Here, in the case where it is determined not to start data transfer, the row of at least one of the judgment targets in the transfer destination management table 152 and the transfer source management table 153 is moved to a different row. At this point, if a loop process is performed while always using either one of the data transfer source and the data transfer destination as a base, it is likely to cause disproportion in the READY count (the number of LUs in a transfer waiting state) in the other. In view of this, according to the second embodiment, whether the row of the transfer destination management table 152 is moved or the row of the transfer source management table 153 is moved is determined based on the magnitude of the variation in the READY count for individual disks in the transfer destination set and the transfer source set.

[Step S123] The transfer order determining unit 160 initializes, both in the transfer destination management table 152 and the transfer source management table 153, a row number of a row against which a judgment is made whether to cause the row to be a transfer start target ("judgment row"). For example, the transfer order determining unit 160 sets a variable tA to indicating the row number of the judgment row of the transfer destination management table 152 to "1". In addition, the transfer order determining unit 160 sets a variable tB indicating the row number of the judgment row of the transfer destination management table 153 to "1".

[Step S124] The transfer order determining unit 160 acquires a disk ID in the tA-th row of the transfer destination management table 152. The transfer order determining unit 160 sets a variable dstDisk to the acquired disk ID.

[Step S125] The transfer order determining unit 160 acquires a disk ID in the tB-th row of the transfer source management table 153. The transfer order determining unit 160 sets a variable srcDisk to the acquired disk ID.

[Step S126] The transfer order determining unit 160 determines whether a transfer pair corresponding to a pair of disks indicated by the variables dstDisk and srcDisk is registered in the state management table 151. If a corresponding transfer pair is registered, the transfer order determining unit 160 proceeds the processing to Step S127. On the other hand, if no corresponding transfer pair is registered, the transfer order determining unit 160 proceeds the processing to Step S131.

[Step S127] The transfer order determining unit 160 extracts, from the state management table 151, information on one or more transfer pairs corresponding to the pair of disks indicated by the variables dstDisk and scrDisk found in Step S126. Then, the transfer order determining unit 160 determines whether there is a transfer pair in a transfer waiting state (READY) among the extracted transfer pairs. If there is a transfer pair in a transfer waiting state among the extracted transfer pairs, the transfer order determining unit 160 proceeds the processing to Step S128. On the other hand, if there is no transfer pair in a transfer waiting state among the extracted transfer pairs, the transfer order determining unit 160 proceeds the processing to Step S131.

[Step S128] The transfer order determining unit 160 determines whether the number of competition in a transfer destination disk, which is indicated by the variable dstDisk, is equal to or smaller than the competition allowable number. The number of competition in a transfer destination disk is the USING count of a corresponding disk in the transfer destination management table 152. If the number of competition in the transfer destination disk is equal to or smaller than the competition allowable number, the transfer order determining unit 160 proceeds the processing to Step S129. On the other hand, if the number of competition in the transfer destination disk exceeds the competition allowable number, the transfer order determining unit 160 proceeds the processing to Step S131.

[Step S129] The transfer order determining unit 160 determines whether the number of competition in a transfer source disk, which is indicated by the variable srcDisk, is equal to or smaller than the competition allowable number. The number of competition in a transfer source disk is the USING count of a corresponding disk in the transfer source management table 153. If the number of competition in the transfer source disk is equal to or smaller than the competition allowable number, the transfer order determining unit 160 proceeds the processing to Step S130. On the other hand, if the number of competition in the transfer source disk exceeds the competition allowable number, the transfer order determining unit 160 proceeds the processing to Step S131.

[Step S130] The transfer order determining unit 160 selects one transfer pair in a transfer waiting state from among transfer pairs corresponding to a pair of disks indicated by the variables dstDisk and scrDisk, and determines the selected transfer pair as a transfer start target pair. Then, the transfer pair determination process is ended. On the other hand, in the case where a transfer pair corresponding to a pair of disks indicated by the variables dstDisk and scrDisk may not be set as a transfer start target, the following processing is performed.

[Step S131] The transfer order determining unit 160 determines whether rows corresponding to the row numbers set as the variables dstDisk and srcDisk are the last row in the transfer destination management table 152 and the last row in the transfer source management table 153, respectively. If both are the last rows, the transfer order determining unit 160 proceeds the processing to Step S133. On the other hand, if at least one of the rows is not the last row, the transfer order determining unit 160 proceeds the processing to Step S132.

[Step S132] The transfer order determining unit 160 performs the judgment row shifting process. The judgment row shifting process is a process for shifting, to the next row, the judgment row of either one of the transfer destination management table 152 and the transfer source management table 153. Details of the judgment row shifting process are described later (see FIG. 21). The transfer order determining unit 160 subsequently proceeds the processing to Step S124.

[Step S133] If the rows corresponding to the row numbers set as the variables dstDisk and srcDisk are the last row in the transfer destination management table 152 and the last row in the transfer source management table 153, respectively, the transfer order determining unit 160 adds 1 to the competition allowable number. Then, the transfer order determining unit 160 proceeds the processing to Step S123.

According to the above-described procedure, a transfer pair to be a transfer start target is determined.

Next described is an example of calculating a variation in the READY counts of individual disks, which calculation is performed in Step S122. The variation is expressed as, for example, a standard deviation σ or a range R. The variation is calculated as follows. The standard deviation σ is calculated by the following equation (1).

$$\text{STANDARD DEVIATION}(\sigma) = \sqrt{\frac{\sum_{i=1}^{N}(x_j - Ave)^2}{N}} \quad (1)$$

In the equation (1), N (an integer equal to or greater than 1) is the number of disks in the storage apparatus 100 or 200. In the case where RAID groups have been created in the storage apparatus 100 or 200, one RAID group is converted to one disk. i (an integer equal to or greater than 1) is a disk number starting from 1. $X_i$ is the READY count of the i-th disk. Ave is the average value of the READY counts of the individual disks. Note that the value under the square root of Equation (1) is called variance.

Figure 20:
FIG. 20 illustrates an example of calculating variations.

FIG. 20 illustrates an example of calculating variations. In the example of FIG. 20, the READY counts of five transfer destination disks (IDs: A, B, C, D, and E) are "3", 2 "3", "2", and "5". The average value of these READY counts is: (3+2+3+2+5)/5=3. The variance is: $\{(3-3)^2+(2-3)^2+(3-3)^2+(2-3)^2+(5-3)^2\}/5=1.2$. The standard deviation which is the positive square root of the variance is about 1.1. On the other hand, the READY counts of five transfer source disks (IDs: a, b, c, d, and e) are "1", "5", "3", "2", and "4". The average value of these READY counts is: (1+5+3+2+4)/5=3. The variance is: $\{(1-3)^2+(5-3)^2+(3-3)^2+(2-3)^2+(4-3)^2\}/5=2$. The standard deviation which is the positive square root of the variance is about 1.4. In the example of FIG. 20, the transfer source set has a larger standard deviation than the transfer destination set. That is, the transfer source set has a larger variation. In addition, the range R is calculated by the following Equation (2), where MAX and MIN are the maximum value and minimum value, respectively, of the READY counts of the individual disks.

$$\text{RANGE}(R) = \text{MAX} - \text{MIN} \quad (2)$$

The judgment row shifting process is performed using the values representing variations of the transfer destination set and the transfer source set, obtained by Equation (1) or (2) above.

Figure 21:
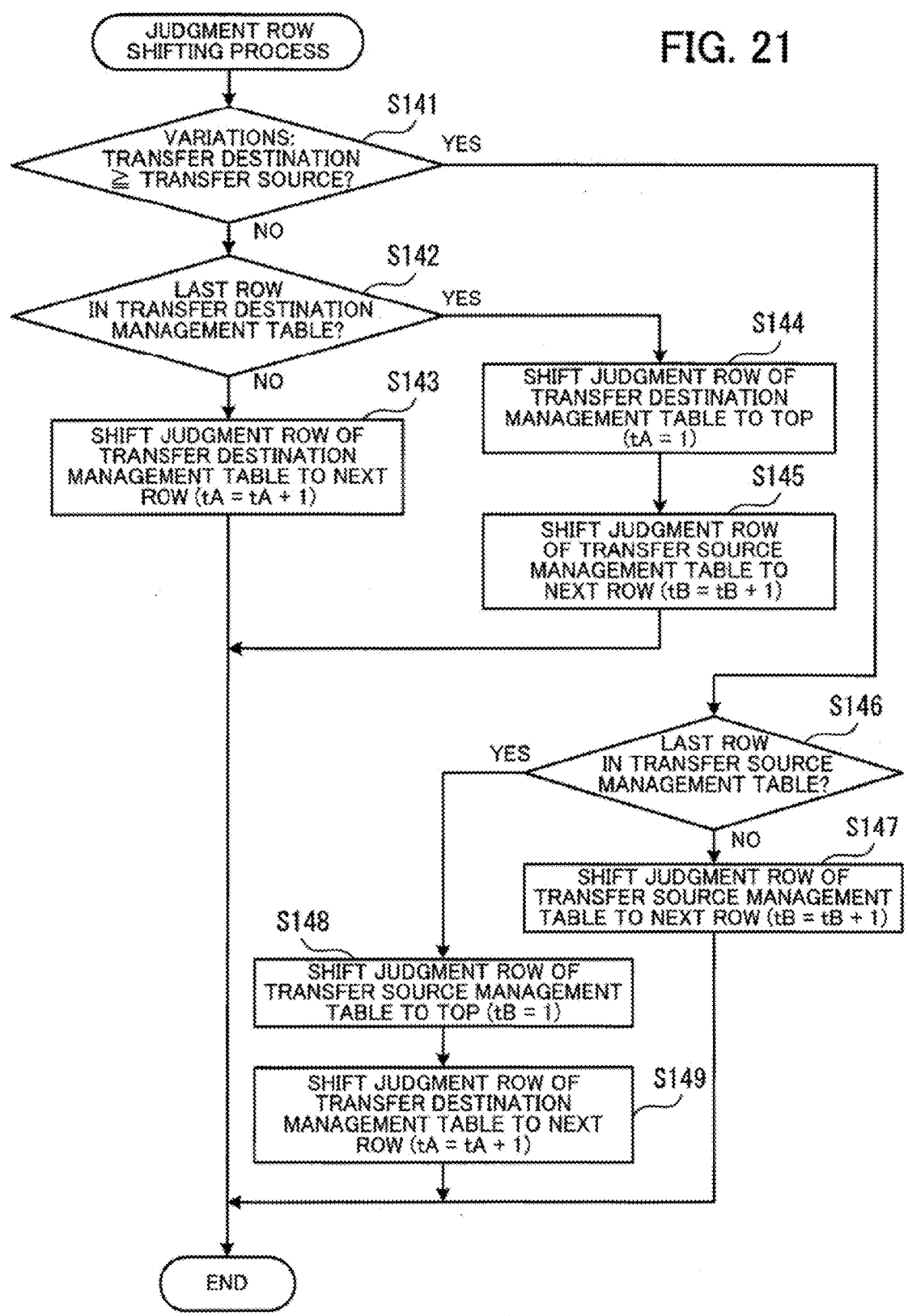
FIG. 21 is a flowchart illustrating a procedure of a judgment row shifting process.

FIG. 21 is a flowchart illustrating a procedure of a judgment row shifting process. The process of FIG. 21 is described next according to the step numbers.

[Step S141] The transfer order determining unit 160 compares the variations in the READY counts of the individual disks in the transfer destination set and the transfer source set, and determines whether the variation in the transfer destination set is equal to or larger than that in the transfer source set. If the variation in the transfer destination set is equal to or larger than the variation in the transfer source set, the transfer order determining unit 160 proceeds the processing to Step S146. On the other hand, if the variation in the transfer destination set is less than the variation in the transfer source set, the transfer order determining unit 160 proceeds the processing to Step S142.

[Step S142] In the case where the variation in the transfer destination set is smaller than the variation in the transfer source set, the transfer order determining unit 160 determines whether the current judgment row (tA-th row) of the transfer destination management table 152 is the last row of the transfer destination management table 152. If the tA-th row is the last row, the transfer order determining unit 160 proceeds the processing to Step S144. On the other hand, if the tA-th row is not the last row, the transfer order determining unit 160 proceeds the processing to Step S143.

[Step S143] In the case where the current judgment row is not the last row in the transfer destination management table 152, the transfer order determining unit 160 shifts the judgment row to the next row. For example, the transfer order determining unit 160 adds 1 to the variable tA. Subsequently, the judgment row shifting process is ended.

[Step S144] In the case where the current judgment row is the last row in the transfer destination management table 152, the transfer order determining unit 160 shifts the judgment row to the top of the transfer destination management table 152. For example, the transfer order determining unit 160 changes the value of the variable tA to 1.

[Step S145] The transfer order determining unit 160 shifts the judgment row of the transfer source management table 153 to the next row. For example, the transfer order determining unit 160 adds 1 to the variable tB. Subsequently, the judgment row shifting process is ended.

[Step S146] In the case where the variation in the transfer destination set is equal to or larger than the variation in the transfer source set, the transfer order determining unit 160 determines whether the current judgment row (tB-th row) of the transfer source management table 153 is the last row of the transfer source management table 153. If the tB-th row is the last row, the transfer order determining unit 160 proceeds the processing to Step S148. On the other hand, if the tB-th row is not the last row, the transfer order determining unit 160 proceeds the processing to Step S147.

[Step S147] In the case where the current judgment row is not the last row in the transfer source management table 153, the transfer order determining unit 160 shifts the judgment row of the transfer source management table 153 to the next row. For example, the transfer order determining unit 160 adds 1 to the variable tB. Subsequently, the judgment row shifting process is ended.

[Step S148] In the case where the current judgment row is the last row in the transfer source management table 153, the transfer order determining unit 160 shifts the judgment row to the top of the transfer destination management table 153. For example, the transfer order determining unit 160 changes the value of the variable tB to 1.

[Step S149] The transfer order determining unit 160 shifts the judgment row of the transfer destination management table 152 to the next row. For example, the transfer order determining unit 160 adds 1 to the variable tA. Subsequently, the judgment row shifting process is ended.

Thus, a transfer pair to be a transfer start target is searched for in such a manner that, between the transfer destination set and the transfer source set, the judgment row is not shifted, if possible, in a set having a larger variation and the judgment row is shifted in the other set having a smaller variation.

Figure 22:
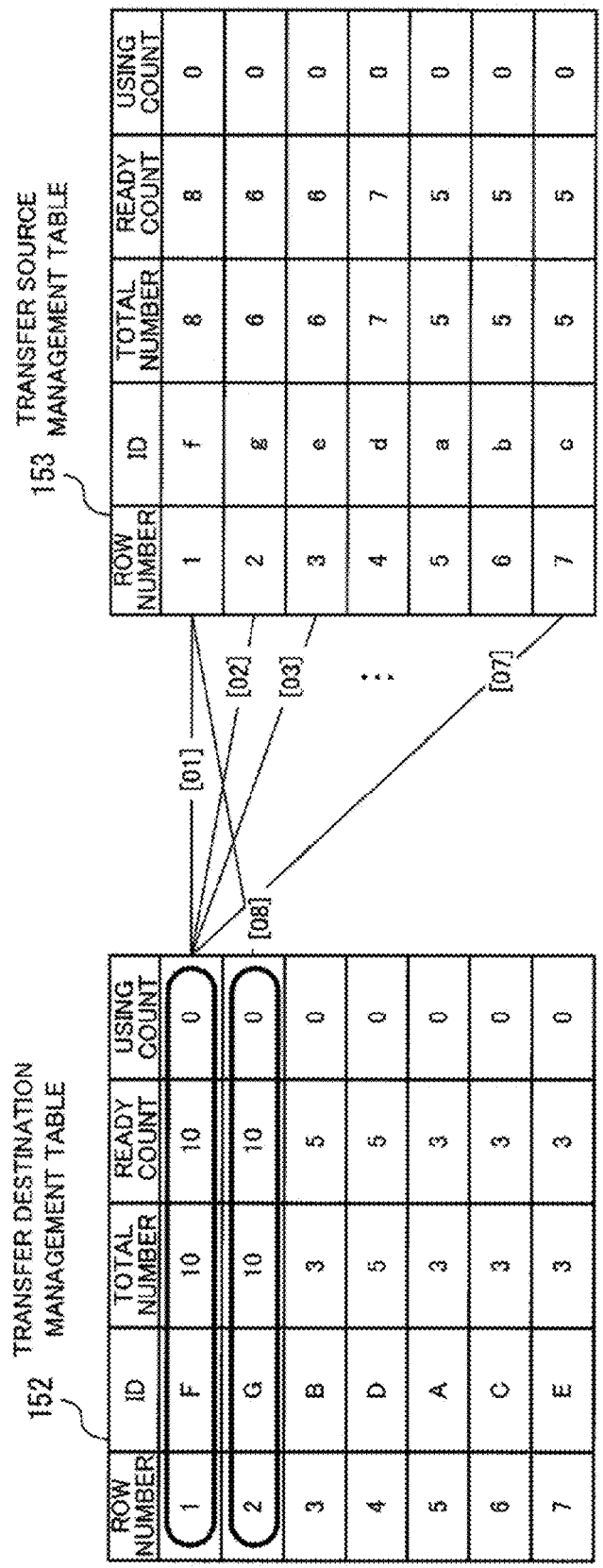
FIG. 22 illustrates an example of determining a transfer pair to be a transfer start target.

FIG. 22 illustrates an example of determining a transfer pair to be a transfer start target. The example of FIG. 22 illustrates a case where the transfer destination set has a larger variation in the READY count than the transfer source set. In addition, in FIG. 22, each combination of a transfer destination judgment row and a transfer source judgment row is connected by a line, and a sequence for judging whether there is a transfer pair to be a transfer start target is indicated by numbers in brackets on the individual lines. A combination of the judgment rows for the first judgment ([01] in FIG. 22) is made up of the first row of the transfer destination management table 152 and the first row of the transfer source management table 153. If no transfer pair for starting data transfer is found in disks corresponding to the combination of the judgment rows for the first judgment, a judgment row is shifted. According to the example of FIG. 22, the transfer destination set has a larger variation in the READY count. Therefore, the judgment row of the transfer destination management table 152 is fixed, and the judgment row of the transfer source management table 153 is shifted. As a result, a combination of the judgment rows for the second judgment ([02] in FIG. 22) is made up of the first row of the transfer destination management table 152 and the second row of the transfer source management table 153. Similarly, a combination of the judgment rows for the third judgment ([03] in FIG. 22) is made up of the first row of the transfer destination management table 152 and the third row of the transfer source management table 153. Subsequently, until a transfer pair for starting data transfer is found, the judgment row of the transfer source set is sequentially shifted. For example, a combination of the judgment rows for the seventh judgment ([07] in FIG. 22) is made up of the first row of the transfer destination management table 152 and the seventh row of the transfer source management table 153. The seventh row of the transfer source management table 153 is the last row of the transfer source management table 153. Therefore, the judgment rows of both the transfer destination set and the transfer source set are shifted, and a combination of the judgment rows for the eighth judgment ([08] in FIG. 22) is made up of the second row of the transfer destination management table 152 and the first row of the transfer source management table 153.

As described above, out of the transfer destination set and the transfer source set, one statistically having a larger variation in the READY count is used as the judgment base. Herewith, with the progress of the data transfer processing, scheduling is achieved in such a manner as to even out the READY counts among the individual disks. As for a transfer pair determined to be a target for starting data transfer, data is copied by one data transfer unit from the transfer source LU to the transfer destination LU of the transfer pair. In the course of such data transfer processing, information of the management table storing unit 150 is updated as appropriate.

Figure 23:
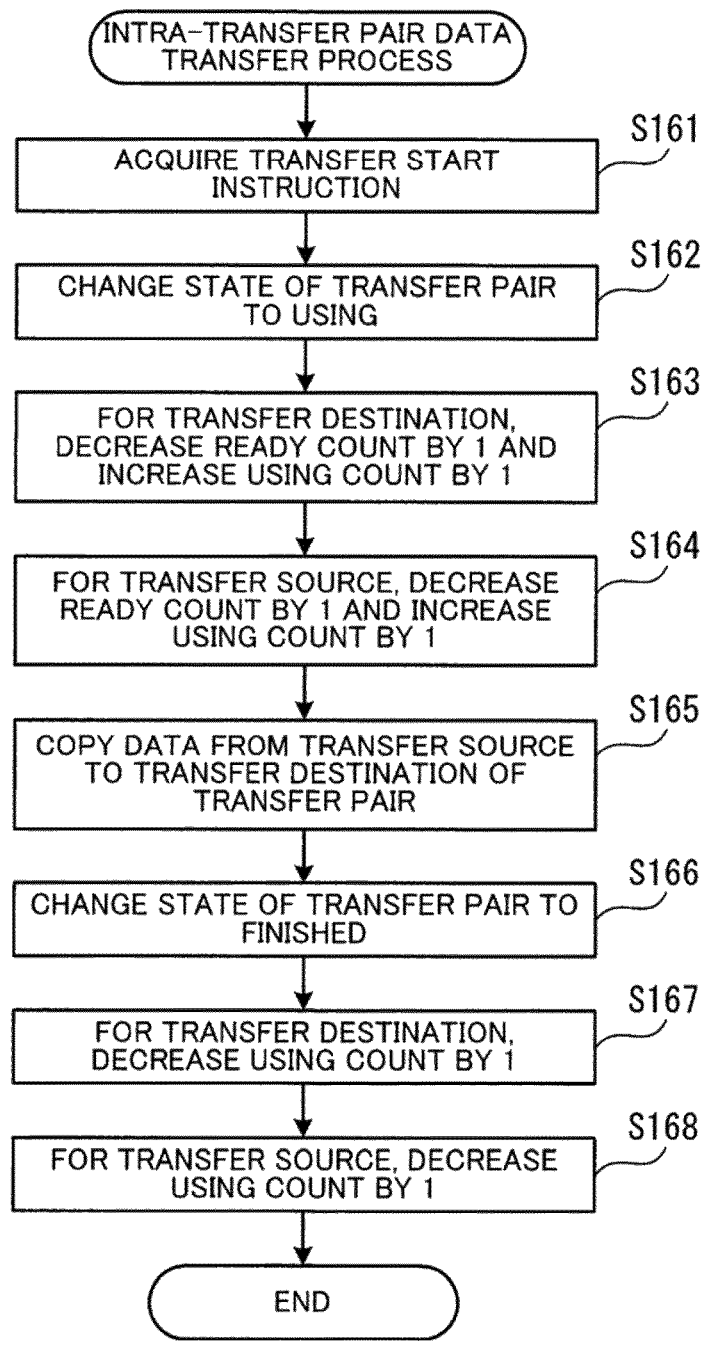
FIG. 23 is a flowchart illustrating an example of a procedure of an intra-transfer pair data transfer process.

Next described is a procedure of an intra-transfer pair data transfer process (that is, a data transfer process between a transfer pair). FIG. 23 is a flowchart illustrating an example of a procedure of an intra-transfer pair data transfer process. The process of FIG. 23 is described next according to the step numbers. Assume in the following description that the data transfer unit 181 performs data transfer between a transfer pair.

[Step S161] The data transfer unit 181 acquires a transfer start instruction from the transfer control unit 170. The transfer start instruction includes information of a transfer pair for which starting the data transfer has been determined (such a transfer pair is hereinafter referred to as "transfer start determined pair").

[Step S162] The data transfer unit 181 changes, in the state management table 151, the state of the transfer start determined pair to USING.

[Step S163] As for the transfer destination disk of the transfer start determined pair, the data transfer unit 181 decreases, in the transfer destination management table 152, the value of a corresponding READY count by 1 and increases the value of a corresponding USING count by 1.

[Step S164] As for the transfer source disk of the transfer start determined pair, the data transfer unit 181 decreases, in the transfer source management table 153, the value of a corresponding READY count by 1 and increases the value of a corresponding USING count by 1.

[Step S165] The data transfer unit 181 copies data from the transfer source to the transfer destination of the transfer start determined pair. For example, the data transfer unit 181 transmits, to the storage apparatus 200 via an unused path, a data read request for reading data in the transfer source LU. The storage apparatus 200 reads the data from the transfer source LU in response to the data read request, and transmits the read data to the storage apparatus 100. In the storage apparatus 100, a CA having transmitted the data read request receives the data transmitted from the storage apparatus 200 and, then, transfers the data to the CM 120. The data transfer unit 181 which functions in the CM 120 writes, in the transfer destination LU via a DI, the data transmitted from the storage apparatus 200.

[Step S166] After completing the data copy, the data transfer unit 181 changes, in the state management table 151, the state of the transfer start determined pair to FINISHED.

[Step S167] As for the transfer destination disk of the transfer start determined pair, the data transfer unit 181 decreases, in the transfer destination management table 152, the value of the corresponding USING count by 1.

[Step S168] As for the transfer source disk of the transfer start determined pair, the data transfer unit 181 decreases, in the transfer source management table 153, the value of the corresponding USING count by 1.

In the above-described manner, information in the management table storing unit 150 is updated according to the progress of the data transfer between the transfer pair.

Figure 24:
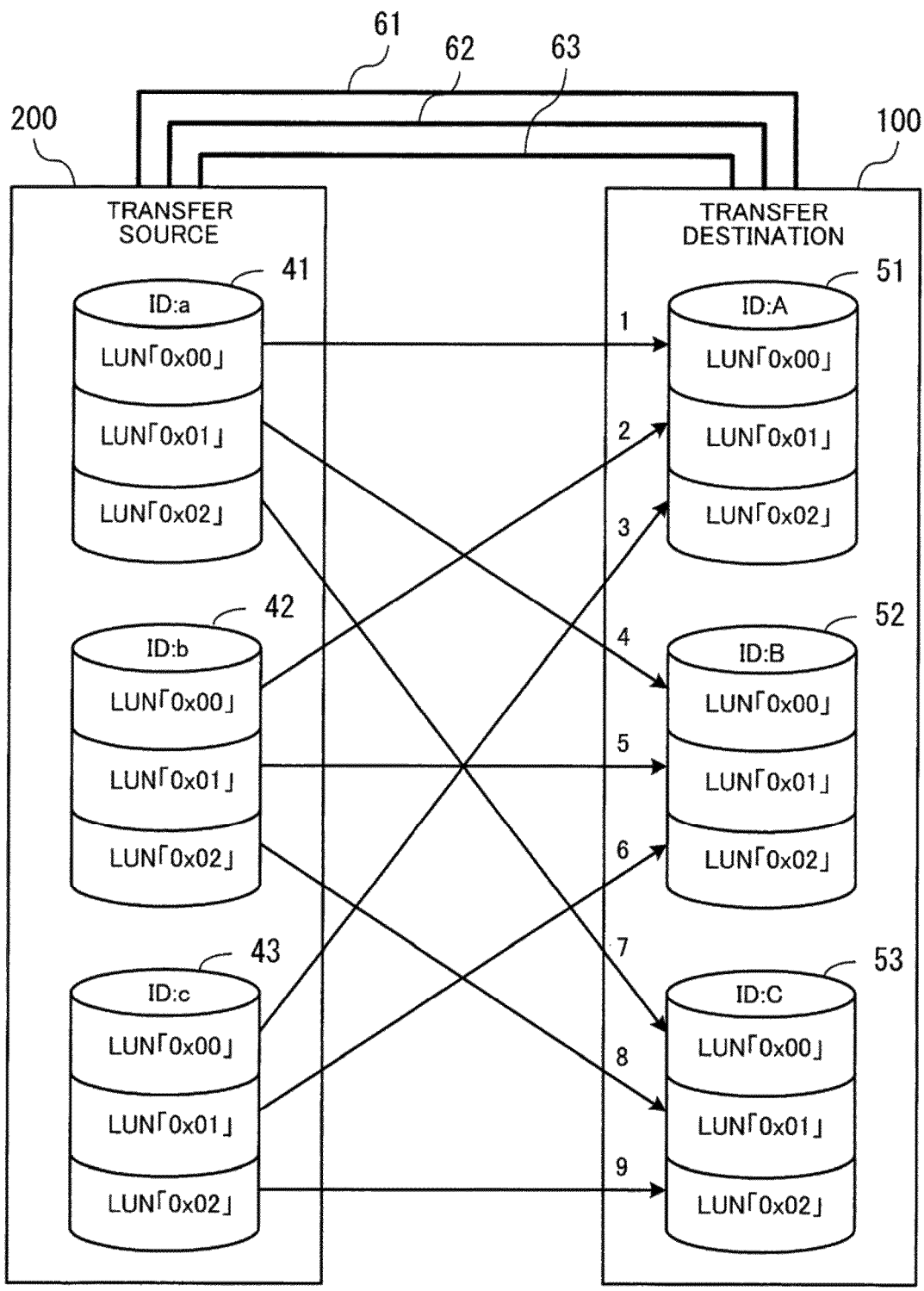
FIG. 24 illustrates an example of data transfer.

Next described is a data transfer example. FIG. 24 illustrates a data transfer example. In the example of FIG. 24, three disks 41 to 43 are provided in the storage apparatus 200 which is a data transfer source. Similarly, three disks 51 to 53 are provided in the storage apparatus 100 which is a data transfer destination. Each of the disks 41 to 43 and 51 to 53 is, for example, a RAID group formed by RAID technology. In each of the disks 41 to 43 and 51 to 53, three LUs are provided. An identification number (LUN) is given to each of the LUs. Between the two storage apparatuses 100 and 200, three paths 61 to 63 are provided for data transfer. In FIG. 24, two LUs making up each transfer pair are connected by an arrow. A number above each arrow represents, in a state management table (see FIGS. 25 to 30), a row number of the record of a transfer pair corresponding to the arrow.

The transfer destination of data in an LU with an LUN "0x00" of the disk 41 is an LU with an LUN "0x00" of the disk 51. The transfer destination of data in an LU with an LUN "0x01" of the disk 41 is an LU with an LUN "0x00" of the disk 52. The transfer destination of data in an LU with an LUN "0x02" of the disk 41 is an LU with an LUN "0x00" of the disk 53. The transfer destination of data in an LU with an LUN "0x00" of the disk 42 is an LU with an LUN "0x01" of the disk 51. The transfer destination of data in an LU with an LUN "0x01" of the disk 42 is an LU with an LUN "0x01" of the disk 52. The transfer destination of data in an LU with an LUN "0x02" of the disk 42 is an LU with an LUN "0x01" of the disk 53. The transfer destination of data in an LU with an LUN "0x00" of the disk 43 is an LU with an LUN "0x02" of the disk 51. The transfer destination of data in an LU with an LUN "0x01" of the disk 43 is an LU with an LUN "0x02" of the disk 52. The transfer destination of data in an LU with an LUN "0x02" of the disk 43 is an LU with an LUN "0x02" of the disk 53.

Figure 25:
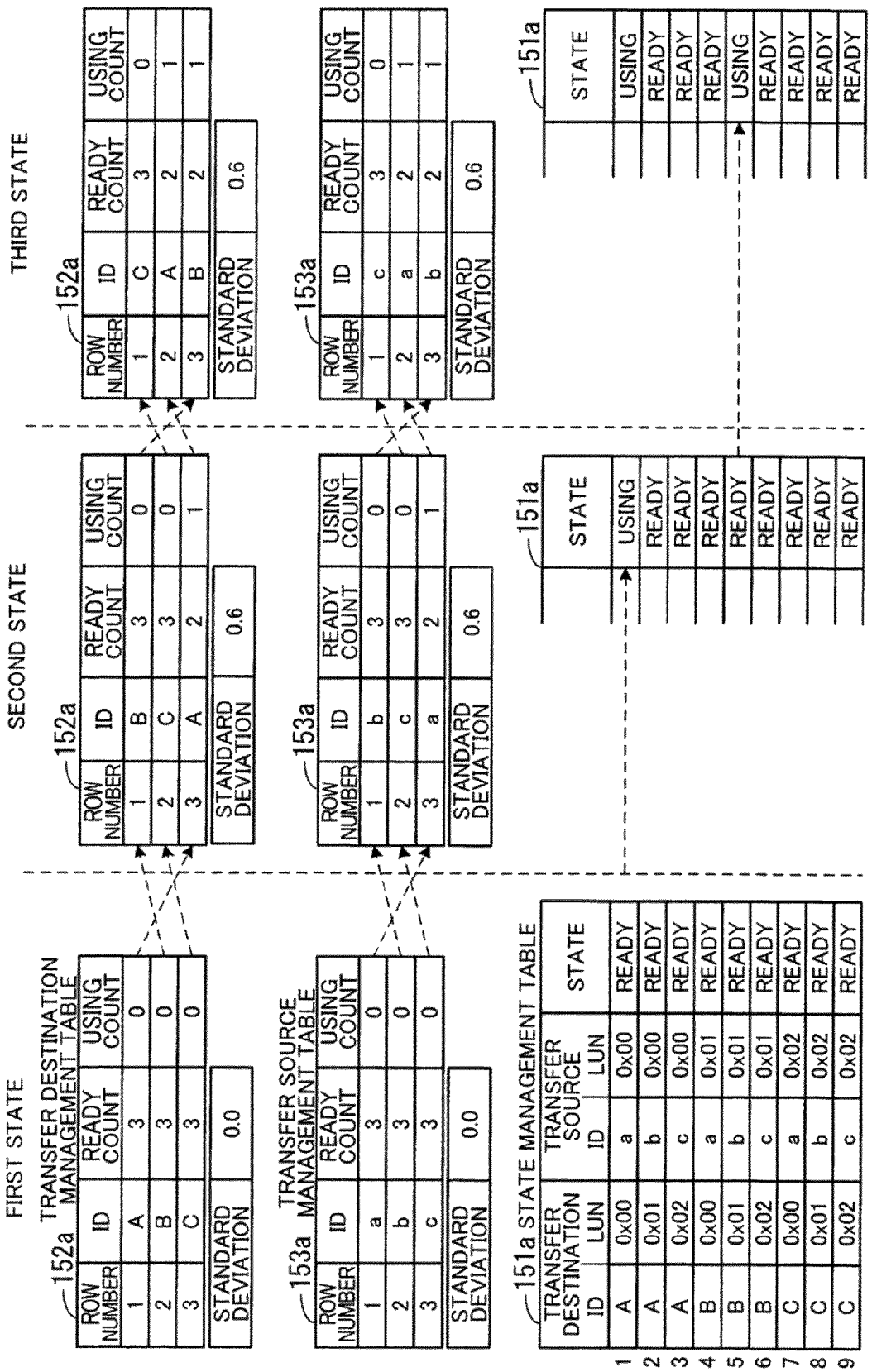
FIG. 25 is a first diagram illustrating information transition at the time of data transfer.

Data transfer transition observed when the data transfer illustrated in FIG. 24 is performed is described next with reference to FIGS. 25 to 30. Note that, in transfer destination management tables and transfer source management tables of FIGS. 25 to 30, the total number column is omitted. In the following example, if there are multiple records having a common READY count as well as a common USING count in a transfer destination management table or a transfer source management table, the multiple records are sorted according to the alphabet set in the ID column. FIG. 25 is a first diagram illustrating information transition at the time of data transfer. FIG. 25 illustrates a state management table 151a, a transfer destination management table 152a, and a transfer source management table 153a at the time when the data transfer illustrated in FIG. 24 is performed.

[First State]

In a first state, each management table is in the initial state. In the initial state, all transfer pairs set in the state management table 151a are in the state of "READY". The READY counts and the USING counts of all the disks set in the transfer destination management table 152a are "3" and "0", respectively. The READY counts and the USING counts of all the disks set in the transfer source management table 153a are "3" and "0", respectively. In addition, both the transfer destination set and the transfer source set have a standard deviation of 0.0. When the data transfer processing starts with the individual management tables being in the first state, a transfer pair for performing data transfer between disks each appearing in the topmost row of the transfer destination management table 152a and the transfer source management table 153a is determined as a transfer start target. According to the example of FIG. 25, the transfer pair set in the first row of the state management table 151a is determined as a transfer start target. When data transfer between the transfer pair determined as a transfer start target is started, the content of the individual management tables is updated in such a manner that the individual management tables are changed to a second state.

[Second State]

In the second state, the state of the transfer pair set in the first row of the state management table 151a has been changed to "USING". In the transfer destination management table 152a, the READY count and the USING count of a disk with an ID "A" have been changed to "2" and "1", respectively. As a result, the standard deviation of the READY count becomes "0.6". In addition, after being sorted according to the USING count and the READY count, the records in the transfer destination management table 152a are listed in the order of IDs "B", "C", and "A" from the top. In the transfer source management table 153a, the READY count and the USING count of a disk with an ID "a" have been changed to "2" and "1", respectively. As a result, the standard deviation of the READY count becomes "0.6". In addition, after being sorted according to the USING count and the READY count, the records in the transfer source management table 153a are listed in the order of IDs "b", "c", and "a" from the top.

In the second state, a transfer pair for performing data transfer between disks each appearing in the topmost row of the transfer destination management table 152a and the transfer source management table 153a is determined as a transfer start target. According to the example of FIG. 25, the transfer pair set in the fifth row of the state management table 151a is determined as a transfer start target. When data transfer between the transfer pair determined as a transfer start target is started, the content of the individual management tables is updated in such a manner that the individual management tables are changed to a third state.

[Third State]

In the third state, the state of the transfer pair set in the fifth row of the state management table 151a has been changed to "USING". In the transfer destination management table 152a, the READY count and the USING count of the disk with the ID "B" have been changed to "2" and "1", respectively. The standard deviation of the READY count remains "0.6". In addition, after being sorted according to the USING count and the READY count, the records in the transfer destination management table 152a are listed in the order of the IDs "C", "A", and "B" from the top. In the transfer source management table 153a, the READY count and the USING count of the disk with the ID "b" have been changed to "2" and "1", respectively. The standard deviation of the READY count remains "0.6". In addition, after being sorted according to the USING count and the READY count, the records in the transfer source management table 153a are listed in the order of the IDs "c", "a", and "b" from the top.

In the third state, a transfer pair for performing data transfer between disks each appearing in the topmost row of the transfer destination management table 152a and the transfer source management table 153a is determined as a transfer start target. According to the example of FIG. 25, the transfer pair set in the ninth row of the state management table 151a is determined as a transfer start target. When data transfer between the transfer pair determined as a transfer start target is started, the content of the individual management tables is updated in such a manner that the individual management tables are changed to a fourth state (see FIG. 26).

Figure 26:
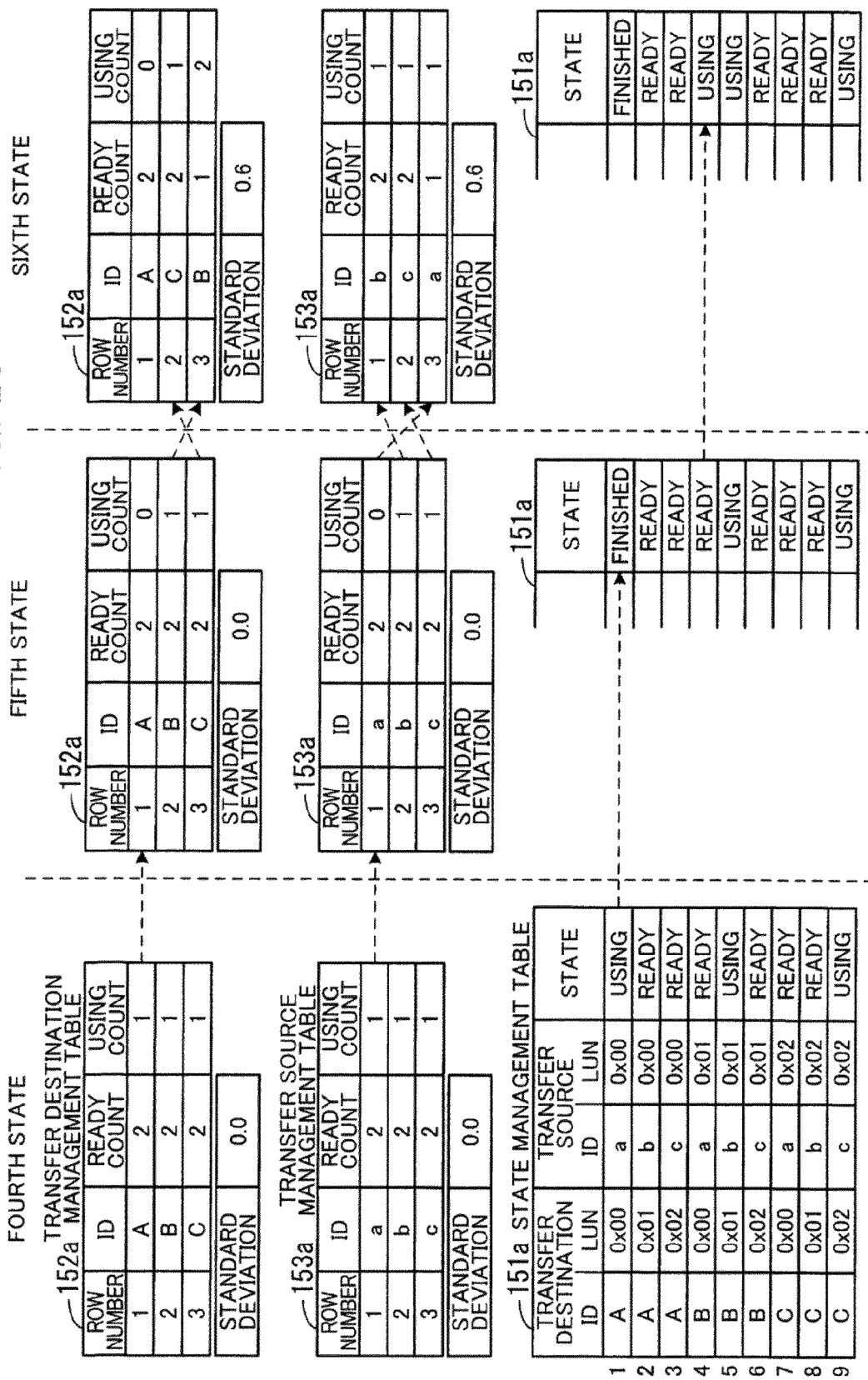
FIG. 26 is a second diagram illustrating the information transition at the time of data transfer.

FIG. 26 is a second diagram illustrating information transition at the time of data transfer.

[Fourth State]

In the fourth state, the state of the transfer pair set in the ninth row of the state management table 151a has been changed to "USING". In the transfer destination management table 152a, the READY count and the USING count of the disk with the ID "C" have been changed to "2" and "1", respectively. As a result, the standard deviation of the READY count becomes "0.0". In addition, after being sorted according to the USING count and the READY count, the records in the transfer destination management table 152a are listed in the order of the IDs "A", "B", and "C" from the top. In the transfer source management table 153a, the READY count and the USING count of the disk with the ID "c" have been changed to "2" and "1", respectively. As a result, the standard deviation of the READY count becomes "0.0". In addition, after being sorted according to the USING count and the READY count, the records in the transfer source management table 153a are listed in the order of the IDs "a", "b", and "c" from the top.

In the fourth state, all three paths are in use and there is no unused path. Therefore, until data transfer is completed for one of the transfer pairs executing the data transfer processing, a transfer pair to be a transfer start target is not determined. When one of the data transfer processes is completed, the content of the individual management tables is updated in such a manner that the individual management tables are changed to a fifth state.

[Fifth State]

In the fifth state, the state of the transfer pair set in the first row of the state management table 151a has been changed to "FINISHED". In the transfer destination management table 152a, the USING count of the disk with the ID "A" has been changed to "0". The standard deviation of the READY count remains "0.0". In the transfer source management table 153a, the USING count of the disk with the ID "a" has been changed to "0". The standard deviation of the READY count remains "0.0".

In the fifth state, a search is made for a transfer pair, whose state is "READY", for performing data transfer between disks each appearing in the topmost row of the transfer destination management table 152a and the transfer source management table 153a. However, there is no such a transfer pair, and therefore, the judgment row shifting process is carried out. In the fifth state, the transfer destination set and the transfer source set have the same standard deviation of the READY count. In such a case, according to the second embodiment, the judgment row of the transfer source management table 153a is fixed to be used as the judgment base and the judgment row of the transfer destination management table 152a is shifted. As a result, the transfer pair set in the fourth row of the state management table 151a is determined as a transfer start target. When data transfer between the transfer pair determined as a transfer start target is started, the content of the individual management tables is updated in such a manner that the individual management tables are changed to a sixth state.

[Sixth State]

In the sixth state, the state of the transfer pair set in the fourth row of the state management table 151a has been changed to "USING". In the transfer destination management table 152a, the READY count and the USING count of the disk with the ID "B" have been changed to "1" and "2", respectively. As a result, the standard deviation of the READY count becomes "0.6". In addition, after being sorted according to the USING count and the READY count, the records in the transfer destination management table 152a are listed in the order of the IDs "A", "C", and "B" from the top. In the transfer source management table 153a, the READY count and the USING count of the disk with the ID "a" have been changed to "1" and "1", respectively. As a result, the standard deviation of the READY count becomes "0.6". In addition, after being sorted according to the USING count and the READY count, the records in the transfer source management table 153a are listed in the order of the IDs "b", "c", and "a" from the top.

Figure 27:
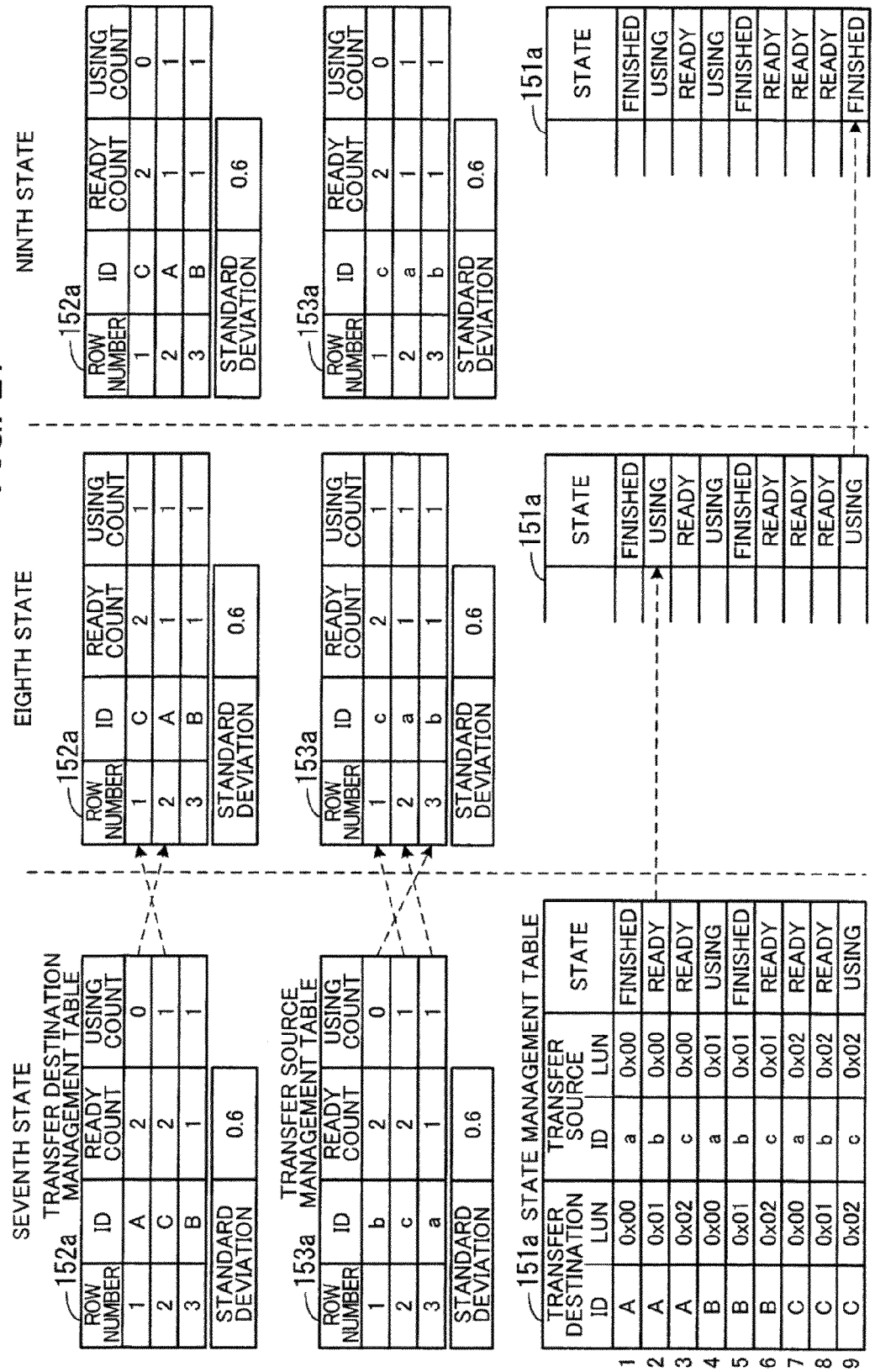
FIG. 27 is a third diagram illustrating the information transition at the time of data transfer.

In the sixth state, when one of the data transfer processes being executed is completed, the content of the individual management tables is updated in such a manner that the individual management tables are changed to a seventh state (see FIG. 27).

FIG. 27 is a third diagram illustrating the information transition at the time of data transfer.

[Seventh State]

In the seventh state, the state of the transfer pair set in the fifth row of the state management table 151a has been changed to "FINISHED". In the transfer destination management table 152a, the USING count of the disk with the ID "B" has been changed to "1". The standard deviation of the READY count remains "0.6". In the transfer source management table 153a, the USING count of the disk with the ID "b" has been changed to "0". The standard deviation of the READY count remains "0.6".

In the seventh state, a search is made for a transfer pair, whose state is "READY", for performing data transfer between disks each appearing in the topmost row of the transfer destination management table 152a and the transfer source management table 153a. As a result, the transfer pair set in the second row of the state management table 151a is determined as a transfer start target. When data transfer between the transfer pair determined as a transfer start target is started, the content of the individual management tables is updated in such a manner that the individual management tables are changed to an eighth state.

[Eighth State]

In the eighth state, the state of the transfer pair set in the second row of the state management table 151a has been changed to "USING". In the transfer destination management table 152a, the READY count and the USING count of the disk with the ID "A" have been changed to "1" and "1", respectively. The standard deviation of the READY count remains "0.6". In addition, after being sorted according to the USING count and the READY count, the records in the transfer destination management table 152a are listed in the order of the IDs "C", "A", and "B" from the top. In the transfer source management table 153a, the READY count and the USING count of the disk with the ID "b" have been changed to "1" and "1", respectively. The standard deviation of the READY count remains "0.6". In addition, after being sorted according to the USING count and the READY count, the records in the transfer source management table 153a are listed in the order of the IDs "c", "a", and "b" from the top.

In the eighth state, when one of the data transfer processes being executed is completed, the content of the individual management tables is updated in such a manner that the individual management tables are changed to a ninth state.

[Ninth State]

In the ninth state, the state of the transfer pair set in the ninth row of the state management table 151a has been changed to "FINISHED". In the transfer destination management table 152a, the USING count of the disk with the ID "C" has been changed to "0". The standard deviation of the READY count remains "0.6". In the transfer source management table 153a, the USING count of the disk with the ID "c" has been changed to "0". The standard deviation of the READY count remains "0.6".

In the ninth state, a search is made for a transfer pair, whose state is "READY", for performing data transfer between disks each appearing in the topmost row of the transfer destination management table 152a and the transfer source management table 153a. However, there is no such a transfer pair, and therefore, the judgment row shifting process is carried out. In the ninth state, the transfer destination set and the transfer source set have the same standard deviation of the READY count. In such a case, the judgment row of the transfer destination management table 152a is shifted to the next row. As a result, the transfer pair set in the third row of the state management table 151a is determined as a transfer start target. When data transfer between the transfer pair determined as a transfer start target is started, the content of the individual management tables is updated in such a manner that the individual management tables are changed to a tenth state (see FIG. 28).

Figure 28:
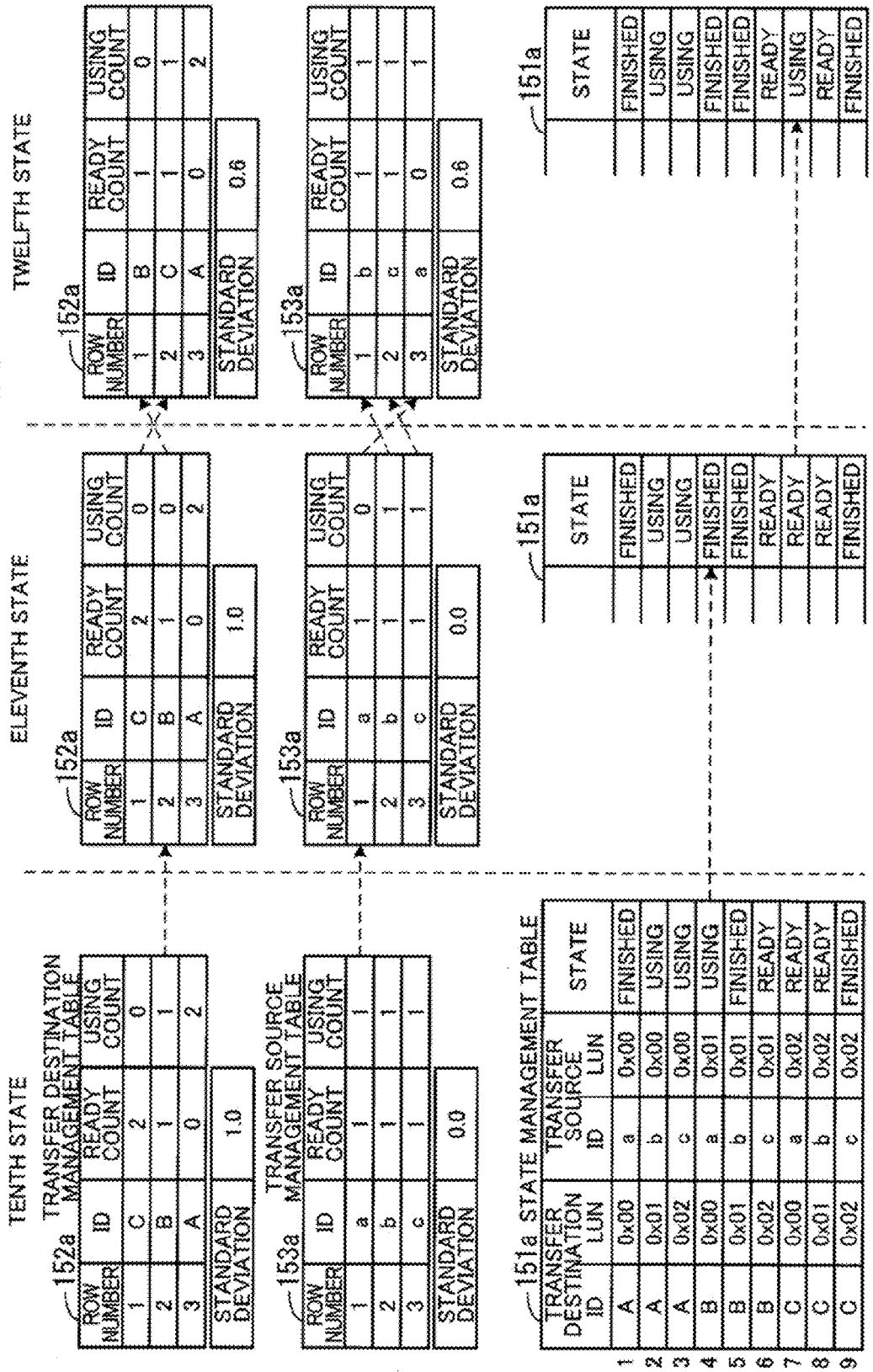
FIG. 28 is a fourth diagram illustrating the information transition at the time of data transfer.

FIG. 28 is a fourth diagram illustrating the information transition at the time of data transfer.

[Tenth State]

In the tenth state, the state of the transfer pair set in the third row of the state management table 151a has been changed to "USING". In the transfer destination management table 152a, the READY count and the USING count of the disk with the ID "A" have been changed to "0" and "2", respectively. As a result, the standard deviation of the READY count becomes "1.0". In addition, after being sorted according to the USING count and the READY count, the records in the transfer destination management table 152a are listed in the order of the IDs "C", "B", and "A" from the top. In the transfer source management table 153a, the READY count and the USING count of the disk with the ID "c" have been changed to "1" and "1", respectively. As a result, the standard deviation of the READY count becomes "0.0". In addition, after being sorted according to the USING count and the READY count, the records in the transfer source management table 153a are listed in the order of the IDs "a", "b", and "c" from the top.

In the tenth state, when one of the data transfer processes being executed is completed, the content of the individual management tables is updated in such a manner that the individual management tables are changed to an eleventh state.

[Eleventh State]

In the eleventh state, the state of the transfer pair set in the fourth row of the state management table 151a has been changed to "FINISHED". In the transfer destination management table 152a, the USING count of the disk with the ID "B" has been changed to "0". The standard deviation of the READY count remains "1.0". In the transfer source management table 153a, the USING count of the disk with the ID "a" has been changed to "0". The standard deviation of the READY count remains "0.0".

In the eleventh state, a search is made for a transfer pair, whose state is "READY", for performing data transfer between disks each appearing in the topmost row of the transfer destination management table 152a and the transfer source management table 153a. As a result, the transfer pair set in the seventh row of the state management table 151a is determined as a transfer start target. When data transfer between the transfer pair determined as a transfer start target is started, the content of the individual management tables is updated in such a manner that the individual management tables are changed to a twelfth state.

Note that, in the eleventh sate, the standard deviation of the READY count of the transfer destination set is "1.0" and the standard deviation of the READY count of the transfer source set is "0.0". According to the example of FIG. 28, in the eleventh state, there is a transfer pair, whose state is "READY", for performing data transfer between disks each appearing in the topmost row of the transfer destination management table 152a and the transfer source management table 153a. Accordingly, no judgment row shifting process takes place. If there is no transfer pair, whose state is "READY", for performing data transfer between the topmost-row disks, the transfer destination set which has a larger standard deviation in the eleventh state is used as the judgment base and the judgment row of the transfer source management table 153a is shifted.

[Twelfth State]

In the twelfth state, the state of the transfer pair set in the seventh row of the state management table 151a has been changed to "USING". In the transfer destination management table 152a, the READY count and the USING count of the disk with the ID "C" have been changed to "1" and "1", respectively. As a result, the standard deviation of the READY count becomes "0.6". In addition, after being sorted according to the USING count and the READY count, the records in the transfer destination management table 152a are listed in the order of the IDs "B", "C", and "A" from the top. In the transfer source management table 153a, the READY count and the USING count of the disk with the ID "a" have been changed to "0" and "1", respectively. As a result, the standard deviation of the READY count becomes "0.6". In addition, after being sorted according to the USING count and the READY count, the records in the transfer source management table 153a are listed in the order of the IDs "b", "c", and "a" from the top.

Figure 29:
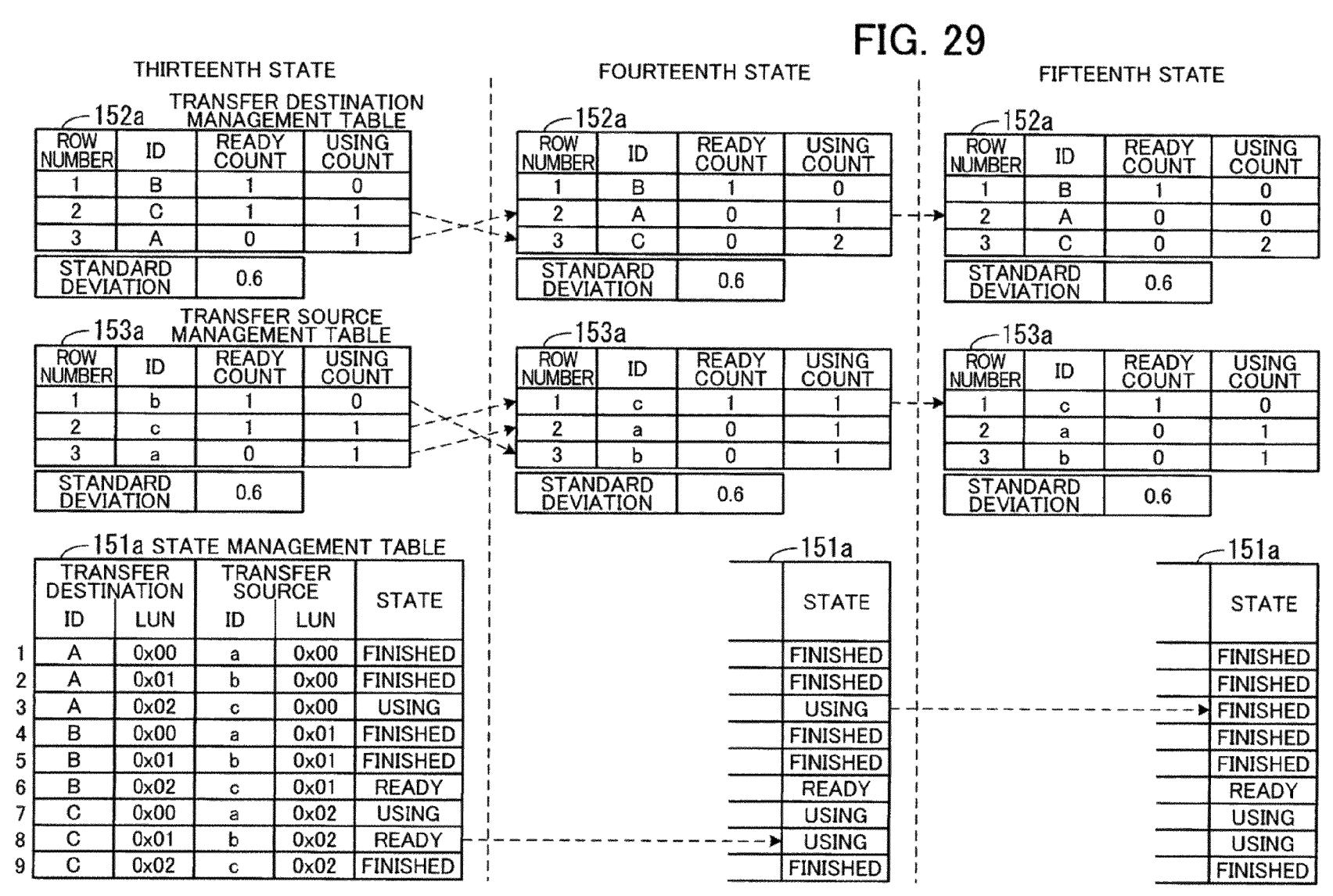

In the twelfth state, when one of the data transfer processes being executed is completed, the content of the individual management tables is updated in such a manner that the individual management tables are changed to a thirteenth state (see FIG. 29).

FIG. 29 is a fifth diagram illustrating the information transition at the time of data transfer.

[Thirteenth State]

In the thirteenth state, the state of the transfer pair set in the second row of the state management table 151a has been changed to "FINISHED". In the transfer destination management table 152a, the USING count of the disk with the ID "A" has been changed to "1". The standard deviation of the READY count remains "0.6". In the transfer source management table 153a, the USING count of the disk with the ID "b" has been changed to "0". The standard deviation of the READY count remains "0.6".

In the thirteenth state, a search is made for a transfer pair, whose state is "READY", for performing data transfer between disks each appearing in the topmost row of the transfer destination management table 152a and the transfer source management table 153a. However, there is no such a transfer pair, and therefore, the judgment row shifting process is carried out. In the thirteenth state, the transfer destination set and the transfer source set have the same standard deviation of the READY count. In such a case, the judgment row of the transfer destination management table 152a is shifted to the next row. As a result, the transfer pair set in the eighth row of the state management table 151a is determined as a transfer start target. When data transfer between the transfer pair determined as a transfer start target is started, the content of the individual management tables is updated in such a manner that the individual management tables are changed to a fourteenth state.

[Fourteenth State]

In the fourteenth state, the state of the transfer pair set in the eighth row of the state management table 151a has been changed to "USING". In the transfer destination management table 152a, the READY count and the USING count of the disk with the ID "C" have been changed to "0" and "2", respectively. The standard deviation of the READY count remains "0.6". In addition, after being sorted according to the USING count and the READY count, the records in the transfer destination management table 152a are listed in the order of the IDs "B", "A", and "C" from the top. In the transfer source management table 153a, the READY count and the USING count of the disk with the ID "b" have been changed to "0" and "1", respectively. The standard deviation of the READY count remains "0.6". In addition, after being sorted according to the USING count and the READY count, the records in the transfer source management table 153a are listed in the order of the IDs "c", "a", and "b" from the top.

In the fourteenth state, when one of the data transfer processes being executed is completed, the content of the individual management tables is updated in such a manner that the individual management tables are changed to a fifteenth state.

[Fifteenth State]

In the fifteenth state, the state of the transfer pair set in the third row of the state management table 151a has been changed to "FINISHED". In the transfer destination management table 152a, the USING count of the disk with the ID "A" has been changed to "0". The standard deviation of the READY count remains "0.6". In the transfer source management table 153a, the USING count of the disk with the ID "c" has been changed to "0". The standard deviation of the READY count remains "0.6".

In the fifteenth state, a search is made for a transfer pair, whose state is "READY", for performing data transfer between disks each appearing in the topmost row of the transfer destination management table 152a and the transfer source management table 153a. As a result, the transfer pair set in the sixth row of the state management table 151a is determined as a transfer start target. When data transfer between the transfer pair determined as a transfer start target is started, the content of the individual management tables is updated in such a manner that the individual management tables are changed to sixteenth state (see FIG. 30).

FIG. 30 is a sixth diagram illustrating the information transition at the time of data transfer.

[Sixteenth State]

In the sixteenth state, the state of the transfer pair set in the sixth row of the state management table 151a has been changed to "USING". In the transfer destination management table 152a, the READY count and the USING count of the disk with the ID "B" have been changed to "0" and "1", respectively. As a result, the standard deviation of the READY count becomes "0.0". In the transfer source management table 153a, the USING count of the disk with the ID "c" has been changed to "0". The standard deviation of the READY count becomes "0.0".

In the sixteenth state, issuing the transfer start instruction for all the transfer pairs is completed. Subsequently, each time data transfer processing being execution is finished, the content of the individual management tables is updated. When data transfer processing for all the transfer pairs is completed, the individual management tables are changed to a seventeenth state.

[Seventeenth State]

In the seventeenth state, the state of each of the transfer pairs set in the sixth, seventh, and eighth rows of the state management table 151a has been changed to "FINISHED". In the transfer destination management table 152a, the USING count of each of the disks with the IDs "B" and "C" has been changed to "0". In the transfer source management table 153a, the USING count of each of the disks with the IDs "a", "b", and "C" has been changed to "0".

In the above-described manner, data transfer from the storage apparatus 200 to the storage apparatus 100 is completed.

The second embodiment produces the following advantageous effects. The second embodiment takes into consideration the number of volumes for which data transfer is in progress (USING count) and the number of volumes waiting for data transfer (READY count) with respect to each disk, as well as variations in the READY count of the data transfer source set and the data transfer destination set. With this, it is possible to determine transfer pairs in such a manner as to reduce disk competition to a minimum throughout the data transfer processing from start to end. This enables efficient data transfer to be automatically carried out, which in turn shortens the time for the data transfer processing. In addition, an operator involved with the data transfer only has to input, to the storage apparatus 100, a transfer instruction including transfer information. Therefore, the operation of determining an execution sequence of the data transfer is no longer necessary, which reduces the burden on human and time resources. In particular for data transfer between large-scale apparatuses, such burden is reduced substantially. Furthermore, since the execution sequence is dynamically determined during the progress of the data transfer, it is possible to determine transfer pairs in such a manner as to reduce disk competition to a minimum even when, for example, a communication path is disconnected during the progress of the data transfer. As a result, even in case of trouble such as disconnection of a communication path, efficient data transfer is achieved.

(c) Other Embodiments

The CM 120 controls the data transfer sequence according to the second embodiment, however, a different component may control the data transfer. For example, one of the multiple CAs in the storage apparatus 100 may control the data transfer sequence. In that case, the CA for controlling the data transfer sequence transmits a data transfer start instruction which specifies a transfer pair to another CA via the CM 120.

In addition, the data transfer destination storage apparatus 100 controls the data transfer sequence according to the second embodiment, however, a different apparatus may control the data transfer sequence. For example, the data transfer source storage apparatus 200 may control the data transfer sequence. In that case, on receiving a data transfer start instruction, a CA of the storage apparatus 200 reads data from a transfer source LU in the storage apparatus 200 and transmits, to the storage apparatus 100, a write request for writing the read data to a transfer destination LU.

In addition, the terminal 300 may control the data transfer sequence. For example, based on the transfer information, the terminal 300 determines a transfer pair to be a data transfer start target and issues, to the storage apparatus 100, an instruction of data transfer between LUs belonging to the transfer pair.

In addition, in the second embodiment, the standard deviation obtained for individual disks in terms of the number of LUs waiting for data transfer (READY count) used as a value indicating a variation in the READY count. However, a variance obtained in the course of calculating the standard deviation may be used as a value indicating the variation.

In addition, the processing functions described in each of the embodiments above may be achieved by a computer. In this case, a program is provided in which the data transfer processing procedure implemented by the storage apparatuses is described. By executing the program on the computer, the above-described processing functions are achieved on the computer. The program in which processing contents are described may be recorded in a computer-readable recording medium. Such computer-readable recording media include a magnetic-storage device, an optical disk, a magneto-optical medium, and a semiconductor memory. Examples of the magnetic-storage device are a hard disk drive (HDD), a flexible disk, and a magnetic tape. Example of the optical disk are a digital versatile disk (DVD), a digital versatile disk random access memory (DVD-RAM), a compact disc read-only memory (CD-ROM), and a CD rewritable (CD-RW). An example of the magneto-optical medium is a magneto-optical disk (MO).

In the case of distributing the program, portable recording media, such as DVDs and CD-ROMs, in which the program is recorded are sold. In addition, the program may be stored in a memory device of a server computer and then transferred from the server computer to another computer via a network.

A computer for executing the program stores the program, which is originally recorded in a portable recording medium or transferred from the server computer, in its own memory device. Subsequently, the computer reads the program from its own memory device and performs processing according to the program. Note that the computer is able to read the program directly from the portable recording medium and perform processing according to the program. In addition, the computer is able to sequentially perform processing according to a received program each time such a program is transferred from the server computer.

In addition, at least part of the above-described processing functions may be achieved by an electronic circuit, such as a digital signal processor (DSP), an application specific integrated circuit (ASIC), and a programmable logic device (PLD).

According to one aspect, it is possible to efficiently perform data copy between different storage apparatuses.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage apparatus comprising:
a plurality of destination storage devices; and
one or more processors that perform a procedure including:
acquiring a copy request which specifies a plurality of logical volume pairs, each of which is made up of a source logical volume and a destination logical volume, each source logical volume being one of logical volumes provided in a plurality of source storage devices of an external storage apparatus, and each destination logical volume being one of logical volumes provided in the plurality of destination storage devices of the storage apparatus;
searching for copy-unexecuted logical volume pairs each being a logical volume pair that is specified by the copy request but has not yet been subjected to copying operation;
preferentially selecting one of the source storage devices that includes a larger number of source logical volumes belonging to the copy-unexecuted logical volume pairs, compared to other source storage devices of the external storage apparatus;
preferentially selecting one of the destination storage devices that includes a larger number of destination logical volumes belonging to the copy-unexecuted logical volume pairs, compared to other destination storage devices of the storage apparatus;
reselecting another source storage device or another destination storage device, when there is no copy-unexecuted logical volume pair whose source logical volume is in the preferentially-selected source storage device and whose destination logical volume is in the preferentially-selected destination storage device, the reselecting being performed by:
calculating first variations in a source ready count among the source storage devices of the external storage apparatus, the source ready count representing how many source logical volumes in an individual source storage device belong to the copy-unexecuted logical volume pairs,
calculating second variations in a destination ready count among the destination storage devices of the storage apparatus, the destination ready count representing how many destination logical volumes in an individual source storage device belong to the copy-unexecuted logical volume pairs,
deselecting the preferentially-selected source storage device and reselecting another source storage device for copying to the preferentially-selected destination storage device that is not deselected, when the first variations are smaller than the second variations, and
deselecting the preferentially-selected destination storage device and reselecting another destination storage device for copying from the preferentially-selected source storage device that is not deselected, when the second variations are smaller than the first variations;
determining a copy-unexecuted logical volume pair whose source logical volume is in the preferentially-selected or reselected source storage device and whose destination logical volume is in the preferentially-selected or reselected destination storage device; and
copying data from the source logical volume of the determined copy-unexecuted logical volume pair to the destination logical volume of the determined copy-unexecuted logical volume pair.

2. The storage apparatus according to claim 1, wherein:
the first variations are represented by a standard deviation or a variance of the source ready counts of the source storage devices; and
the second variations are represented by a standard deviation or a variance of the destination ready counts of the destination storage devices.

3. The storage apparatus according to claim 1, wherein:
the first variations are represented by a difference between a maximum value and a minimum value in the source ready counts of the source storage devices; and
the second variations are represented by a difference between a maximum value and a minimum value in the destination ready counts of the destination storage devices.

4. The storage apparatus according to claim 1, wherein the determining repeatedly performs the determination of the copy-unexecuted logical volume pair to be subjected to the copying when there is an unused communication path between the external storage apparatus and the storage apparatus.

5. The storage apparatus according to claim 1, wherein:
the preferentially selecting one of the source storage devices is executed when there are two or more source storage devices including the same number of source logical volumes specified by the copy request, and
the preferentially selecting one of the destination storage devices is executed when there are two or more destination storage devices including the same number of destination logical volumes specified by the copy request.

6. A control apparatus coupled to a first storage apparatus including a plurality of source storage devices and to a second storage apparatus including a plurality of destination storage devices, the control apparatus comprising:
one or more processors that perform a procedure including:
acquiring a copy request which specifies a plurality of logical volume pairs, each of which is made up of a source logical volume and a destination logical volume, each source logical volume being one of logical volumes provided in the plurality of source storage devices of the first storage apparatus, and each destination logical volume being one of logical volumes provided in the plurality of destination storage devices of the second storage apparatus;
searching for copy-unexecuted logical volume pairs each being a logical volume pair that is specified by the copy request but has not yet been subjected to copying operation;
preferentially selecting one of the source storage devices that includes a larger number of source logical volumes belonging to the copy-unexecuted logical volume pairs, compared to other source storage devices of the first storage apparatus;
preferentially selecting one of the destination storage devices that includes a larger number of destination logical volumes belonging to the copy-unexecuted logical volume pairs, compared to other destination storage devices of the second storage apparatus;
reselecting another source storage device or another destination storage device, when there is no copy-unexecuted logical volume pair whose source logical volume is in the preferentially-selected source storage device and whose destination logical volume is in the preferentially-selected destination storage device, the reselecting being performed by:
- calculating first variations in a source ready count among the source storage devices of the first storage apparatus, the source ready count representing how many source logical volumes in an individual source storage device belong to the copy-unexecuted logical volume pairs,
- calculating second variations in a destination ready count among the destination storage devices of the second storage apparatus, the destination ready count representing how many destination logical volumes in an individual source storage device belong to the copy-unexecuted logical volume pairs,
- deselecting the preferentially-selected source storage device and reselecting another source storage device for copying to the preferentially-selected destination storage device that is not deselected, when the first variations are smaller than the second variations, and
- deselecting the preferentially-selected destination storage device and reselecting another destination storage device for copying from the preferentially-selected source storage device that is not deselected, when the second variations are smaller than the first variations;

determining a copy-unexecuted logical volume pair whose source logical volume is in the preferentially-selected or reselected source storage device and whose destination logical volume is in the preferentially-selected or reselected destination storage device; and copying data from the source logical volume of the determined copy-unexecuted logical volume pair to the destination logical volume of the determined copy-unexecuted logical volume pair.

7. A data copying method comprising:
acquiring a copy request which specifies a plurality of logical volume pairs, each of which is made up of a source logical volume and a destination logical volume, each source logical volume being one of logical volumes provided in a plurality of source storage devices of a first storage apparatus, and each destination logical volume being one of logical volumes provided in a plurality of destination storage devices of a second storage apparatus;

searching for copy-unexecuted logical volume pairs each being a logical volume pair that is specified by the copy request but has not yet been subjected to copying operation;

preferentially selecting one of the source storage devices that includes a larger number of source logical volumes belonging to the copy-unexecuted logical volume pairs, compared to other source storage devices of the first storage apparatus;

preferentially selecting one of the destination storage devices that includes a larger number of destination logical volumes belonging to the copy-unexecuted logical volume pairs, compared to other destination storage devices of the second storage apparatus;

reselecting another source storage device or another destination storage device, when there is no copy-unexecuted logical volume pair whose source logical volume is in the preferentially-selected source storage device and whose destination logical volume is in the preferentially-selected destination storage device, the reselecting being performed by:
- calculating first variations in a source ready count among the source storage devices of the first storage apparatus, the source ready count representing how many source logical volumes in an individual source storage device belong to the copy-unexecuted logical volume pairs,
- calculating second variations in a destination ready count among the destination storage devices of the second storage apparatus, the destination ready count representing how many destination logical volumes in an individual destination storage device belong to the copy-unexecuted logical volume pairs,
- deselecting the preferentially-selected source storage device and reselecting another source storage device for copying to the preferentially-selected destination storage device that is not deselected, when the first variations are smaller than the second variations, and
- deselecting the preferentially-selected destination storage device and reselecting another destination storage device for copying from the preferentially-selected source storage device that is not deselected, when the second variations are smaller than the first variations;

determining a copy-unexecuted logical volume pair whose source logical volume is in the preferentially-selected or reselected source storage device and whose destination logical volume is in the preferentially-selected or reselected destination storage device; and copying data from the source logical volume of the determined copy-unexecuted logical volume pair to the destination logical volume of the determined copy-unexecuted logical volume pair.

8. A storage apparatus comprising:
a plurality of destination storage devices; and
one or more processors that perform a procedure including:
- acquiring a copy request which specifies a plurality of logical volume pairs, each of which is made up of a source logical volume and a destination logical volume, each source logical volume being one of logical volumes provided in a plurality of source storage devices of an external storage apparatus, and each destination logical volume being one of logical volumes provided in the plurality of destination storage devices of the storage apparatus;
- managing a source priority order for selection of the source storage devices in the external storage apparatus, based on source ready counts each representing how many source logical volumes in an individual source storage device belong to logical volume pairs waiting for data copying, and managing a destination priority order for selection of the destination storage devices that the storage apparatus comprises, based on destination ready counts each representing how many destination logical volumes in an individual destination storage device belong to the logical volume pairs waiting for data copying;
- selecting, based on the copy request, one of the source storage devices and one of the destination storage devices respectively according to the source priority order and the destination priority order, and determining a target logical volume pair whose copy source is a source logical volume in the selected source storage device in the external storage apparatus and whose copy destination is a destination logical volume in the selected destination storage device in the storage apparatus; and copying data from the source logical volume to the destination logical volume as specified by the determined target logical volume pair.

* * * * *